United States Patent
Damnjanovic et al.

(10) Patent No.: US 9,985,773 B2
(45) Date of Patent: May 29, 2018

(54) TECHNIQUES FOR PERFORMING HALF/FULL-DUPLEX OPERATIONS IN WIRELESS COMMUNICATIONS

(71) Applicant: QUALCOMM Incorporated, San Diego, CA (US)

(72) Inventors: Jelena Damnjanovic, Del Mar, CA (US); Wanshi Chen, San Diego, CA (US); Peter Gaal, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 14/695,982

(22) Filed: Apr. 24, 2015

(65) Prior Publication Data

US 2015/0333896 A1    Nov. 19, 2015

Related U.S. Application Data

(60) Provisional application No. 61/994,502, filed on May 16, 2014.

(51) Int. Cl.
*H04L 5/16* (2006.01)
*H04W 74/08* (2009.01)
(Continued)

(52) U.S. Cl.
CPC ............... *H04L 5/16* (2013.01); *H04L 5/143* (2013.01); *H04L 5/1438* (2013.01); *H04W 72/048* (2013.01); *H04W 74/0808* (2013.01)

(58) Field of Classification Search
None
See application file for complete search history.

(56) References Cited

U.S. PATENT DOCUMENTS

2009/0213765 A1   8/2009   Rinne et al.
2013/0044654 A1   2/2013   Chen et al.
(Continued)

FOREIGN PATENT DOCUMENTS

EP       2 784 971 A1    10/2014
WO    WO-2013/077554 A1    5/2013

OTHER PUBLICATIONS

International Search Report and Written Opinion—PCT/US2015/027787—ISA/EPO—Sep. 4, 2015. (13 total pages).
LG Electronics: "Remaining RAN1 issues of dual connectivity", 3GPP Draft; R1-142143 DC Details Final, 3rd Generation Partnership Projet (3GPP), Mobile Competence Centre ; 650, Route Des Lucioles ; F-06921 Sophia-Antipolis Cedex France vol. RAN WG1, No. Seoul, Korea; May 19, 2014 May 23, 2014 May 10, 2014 (May 10, 2014), XP050736150, 6 Pages, Retrieved from the Internet: URL: http://www.3gpp.org/ftp/tsg_ran/WG1_RL1/TSGR1_77/Docs/ [retriev ed on May 10, 2014]Sections 2.2, 2.3.
(Continued)

*Primary Examiner* — Edan Orgad
*Assistant Examiner* — Saumit Shah
(74) *Attorney, Agent, or Firm* — Arent Fox LLP and Qualcomm Incorporated

(57) ABSTRACT

Certain aspects of the present disclosure relate to communicating using multiple connectivity in a wireless network. A device can communicate with first cell served by a first access point over a first connection and with a second cell served by a second access point over a second connection. Moreover, the device can determine whether to perform a half-duplex operation or a full-duplex operation for communicating with the first cell served by the first access point over the first connection. The device can further determine whether to perform a half-duplex operation or a full-duplex operation for communicating with the second cell served by the second access point over the second connection.

28 Claims, 9 Drawing Sheets

(51) Int. Cl.
*H04L 5/14* (2006.01)
*H04W 72/04* (2009.01)

(56) References Cited

U.S. PATENT DOCUMENTS

| | | | |
|---|---|---|---|
| 2013/0083704 A1 | 4/2013 | Gaal et al. | |
| 2014/0133369 A1* | 5/2014 | Cheng | H04L 5/16 370/280 |
| 2014/0328228 A1* | 11/2014 | Park | H04B 7/2615 370/280 |
| 2015/0071062 A1* | 3/2015 | Cheng | H04B 7/0689 370/230 |
| 2015/0264666 A1* | 9/2015 | Yi | H04L 5/001 370/329 |

OTHER PUBLICATIONS

NTT DOCOMO: "Views on open issues for dual connectivity", 3GPP Draft; R1-140625, 3rd Generation Partnership Project (3GPP), Mobile Competence Centre ; 650, Route Des Lucioles ; F-06921 Sophia-Antipolis Cedex ; France vol. RAN WG1, No. Prague, Czech Republic; 20140210-20140214 (Feb. 9, 2014), XP050736150, 8 Page, Retrieved from the Internet: URL: http://www.3gpp.org/ftp/Meetings_3GPP_SYNC/RAN/RAN1/Docs/ [retrieved on Feb. 9, 2014] Sections 2.2, 2.3, 3.3.

\* cited by examiner

TECHNIQUES FOR PERFORMING HALF/FULL-DUPLEX OPERATIONS IN WIRELESS COMMUNICATIONS

CLAIM OF PRIORITY UNDER 35 U.S.C. § 119

The present Application for Patent claims priority to Provisional Application No. 61/994,502 entitled "TECHNIQUES FOR PERFORMING HALF/FULL-DUPLEX OPERATIONS IN MULTIPLE CONNECTIVITY WIRELESS COMMUNICATIONS" filed May 16, 2014, which is assigned to the assignee hereof and hereby expressly incorporated in its entirety by reference herein.

FIELD OF THE DISCLOSURE

The present disclosure, for example, relates to wireless communication systems, and more particularly to techniques for performing half/full-duplex operations in wireless communications.

BACKGROUND OF THE DISCLOSURE

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (e.g., eNodeBs) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

To improve the performance of wireless communications, it may be desirable to allow a UE to simultaneously communicate with multiple base stations over multiple uplink grants from the base stations, which can be referred to as multiple connectivity wireless communications, or more specifically, dual connectivity, where the UE communicates over uplink grants from two base stations. The UE may thus utilize one or more carriers to communicate with one or more cells of each of the multiple base stations.

SUMMARY OF THE DISCLOSURE

Aspects of the present disclosure relate generally to wireless communications, and more particularly, to techniques for performing half/full-duplex operations in multiple connectivity wireless communications. For example, techniques for performing half-duplex or full-duplex operations when communicating with multiple cells configured by multiple base stations are described herein.

In accordance with an aspect, a wireless device (e.g., user equipment (UE)) may communicate with multiple cells (e.g., PCell or SCell) configured by one or more base stations (e.g., a master eNodeB (MeNodeB or MeNB) and at least one secondary eNodeB (SeNodeB or SeNB) in multiple connectivity wireless communications) in a wireless network. In an example, based on the carrier configuration for a given one of the multiple cells configured by the one or more base stations, the wireless device may determine whether it can perform half-duplex operations or full-duplex operations with the given one of the multiple cells configured by the one or more base stations. In another example, based on a capability of the wireless device, the wireless device may determine whether it can perform half-duplex operations or full-duplex operations with a given one of the multiple cells configured by the one or more base stations. Where the carrier configurations of the multiple cells allow the wireless device to perform half-duplex operations, however, by virtue of the wireless device communicating with multiple cells configured by multiple base stations, there may be cases where the wireless device itself may be performing full-duplex operations by transmitting to one of the multiple cells configured by one of the one or more base stations while receiving from another one of the multiple cells. Thus, by utilizing multiple connections to the multiple cells configured by the one or more base stations, the wireless device may perform full-duplex operations even where the individual connections may be configured only for half-duplex operations (e.g., in a given time interval or otherwise). In addition, in an example, this can be applied to the case of carrier aggregation where the multiple connections are established on multiple component carriers configured by the same base station (e.g., where the carriers can have dedicated band configurations).

In an example, a method for communicating using multiple connectivity wireless communications in a wireless network is provided. The method includes communicating with a first cell served by a first access point over a first connection, communicating with a second cell served by a second access point over a second connection, determining whether to perform a first half-duplex operation or a first full-duplex operation for communicating with the first cell served by the first access point over the first connection, and determining whether to perform a second half-duplex operation or a second full-duplex operation for communicating with the second cell served by the second access point over the second connection.

The method may also include performing a full-duplex operation by communicating with one of the first cell over the first connection or the second cell over the second connection to receive communications as part of the full-duplex operation, and communicating with the other one of the first cell over the first connection or the second cell over the second connection to transmit communications as part of the full-duplex operation. The method may further include wherein the first connection and the second connection only support half-duplex operations in a time interval related to performing the full-duplex operation.

The method may also include wherein at least one of determining whether to perform the first half-duplex operation or the first full-duplex operation for communicating with the first cell or determining whether to perform the second half-duplex operation or the second full-duplex operation for communicating with second cell is based at least in part on a configuration. Also, the method may include wherein the configuration relates to a carrier aggregation band configuration of a respective one of the first connection and the second connection. The method may further include wherein the configuration relates to one or more capabilities of a user equipment (UE) for communicating using a respective one of the first connection and the second connection. Additionally, the method may include wherein determining whether to perform the second half-duplex operation or the second full-duplex operation for communicating with the second cell comprises determining to perform the second full-duplex operation based at least in part on determining a transmit power for the second full-duplex operation is less than a threshold power. The method may also include wherein the first access point and the second access point are the same access point.

In another example, an apparatus for communicating using multiple connectivity wireless communications in a wireless network is provided. The apparatus includes a communicating component configured to communicate with a first cell served by a first access point over a first connection and communicate with a second cell served by a second access point over a second connection, and a half/full-duplex operation component configured to determine whether to perform a first half-duplex operation or a first full-duplex operation for communicating with the first cell served by the first access point over the first connection and to determine whether to perform a second half-duplex operation or a second full-duplex operation for communicating with the second cell served by the second access point over the second connection.

The apparatus may also include wherein the half/full-duplex operating component is configured to determine to perform a full-duplex operation at least in part by communicating with one of the first cell over the first connection or the second cell over the second connection to receive communications as part of the full-duplex operation, and communicating with the other one of the first cell over the first connection or the second cell over the second connection to transmit communications as part of the full-duplex operation. The apparatus may further include wherein the first connection and the second connection only support half-duplex operations in a time interval related to performing the full-duplex operation with the first cell and the full-duplex operation with the second cell.

The apparatus may also include wherein the half/full duplex operating component is configured to at least one of determine whether to perform the first half-duplex operation or the first full-duplex operation for communicating with the first cell or determine whether to perform the second half-duplex operation or the second full-duplex operation for communicating with second cell based at least in part on a configuration. Furthermore, the apparatus may include wherein the configuration relates to a carrier aggregation band configuration of a respective one of the first connection and the second connection. The apparatus may also include wherein the configuration relates to one or more capabilities of a UE for communicating using a respective one of the first connection and the second connection. The apparatus may further include wherein the half/full duplex operating component is configured to determine whether to perform the second half-duplex operation or the second full-duplex operation for communicating with the second cell at least in part by determining to perform the second full-duplex operation based at least in part on determining a transmit power for the second full-duplex operation is less than a threshold power. Also, the apparatus may include wherein the first access point and the second access point are the same access point.

In yet another example, an apparatus for communicating using multiple connectivity wireless communications in a wireless network is provided. The apparatus may include means for communicating with a first cell served by a first access point over a first connection, means for communicating with a second cell served by a second access point over a second connection, means for determining whether to perform a first half-duplex operation or a first full-duplex operation for communicating with the first cell served by the first access point over the first connection, and means for determining whether to perform a second half-duplex operation or a second full-duplex operation for communicating with the second cell served by the second access point over the second connection.

The apparatus may also include means for performing a full-duplex operation by communicating with one of the first cell over the first connection or the second cell over the second connection to receive communications as part of the full-duplex operation, and communicating with the other one of the first cell over the first connection or the second cell over the second connection to transmit communications as part of the full-duplex operation. The apparatus may further include wherein the first connection and the second connection only support half-duplex operations in a time interval related to performing the full-duplex operation with the first cell and the full-duplex operation with the second cell.

Also, the apparatus may include wherein the means for determining whether to perform the first half-duplex operation or the first full-duplex operation for communicating with the first cell or the means for determining whether to perform the second half-duplex operation or the second full-duplex operation for communicating with second cell determine based at least in part on a configuration. The apparatus may also include wherein the configuration relates to a carrier aggregation band configuration of a respective one of the first connection and the second connection. The apparatus may further include wherein the configuration relates to one or more capabilities of a UE for communicating using a respective one of the first connection and the second connection. The apparatus may also include wherein the first access point and the second access point are the same access point.

In another example, a computer-readable storage medium storing computer executable code for communicating using multiple connectivity wireless communications in a wireless network is provided. The code includes code for communicating with a first cell served by a first access point over a first connection, code for communicating with a second cell served by a second access point over a second connection, code for determining whether to perform a first half-duplex operation or a first full-duplex operation for communicating with the first cell served by the first access point over the first connection, and code for determining whether to perform a second half-duplex operation or a second full-duplex operation for communicating with the second cell served by the second access point over the second connection.

The computer-readable storage medium can also include code for performing a full-duplex operation by communicating with one of the first cell over the first connection or the second cell over the second connection to receive communications as part of the full-duplex operation, and communicating with the other one of the first cell over the first connection or the second cell over the second connection to transmit communications as part of the full-duplex operation. In addition, the computer-readable storage medium can include wherein the first connection and the second connection only support half-duplex operations in a time interval related to performing the full-duplex operation with the first cell and the full-duplex operation with the second cell.

Moreover, the computer-readable storage medium may include wherein the code for determining whether to perform the first half-duplex operation or the first full-duplex operation for communicating with the first cell or the code for determining whether to perform the second half-duplex operation or the second full-duplex operation for communicating with second cell determine based at least in part on a configuration. The computer-readable storage medium may also include wherein the configuration relates to a carrier aggregation band configuration of a respective one of the first connection and the second connection. The computer-readable storage medium may also include wherein the configuration relates to one or more capabilities of a UE for communicating using a respective one of the first connection and the second connection. The computer-readable storage medium may further include wherein the first access point and the second access point are the same access point.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
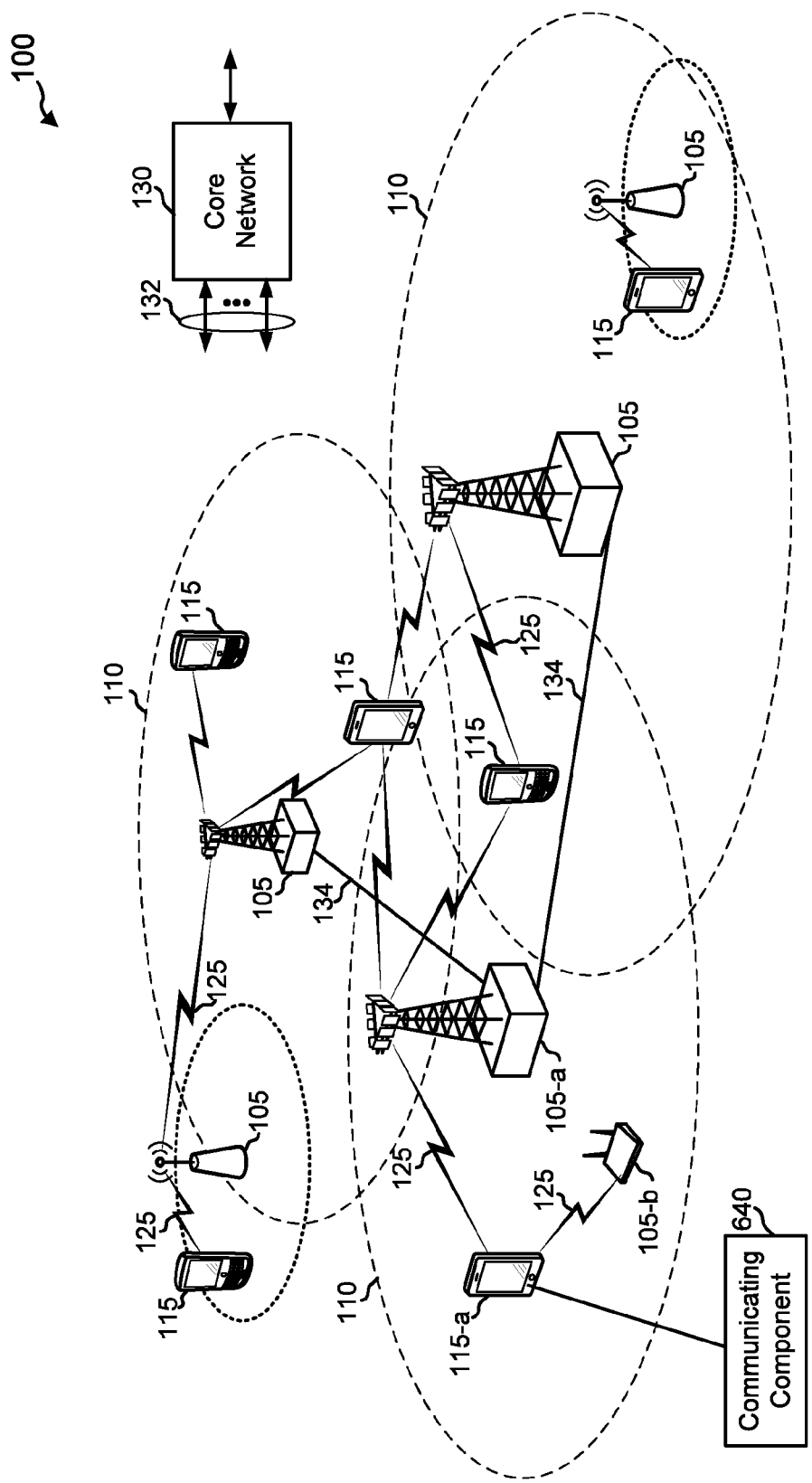
FIG. 1 is a block diagram conceptually illustrating an example of a wireless communications system, in accordance with an aspect of the present disclosure.

The detailed description set forth below, in connection with the appended drawings, is intended as a description of various configurations and is not intended to represent the only configurations in which the concepts described herein may be practiced. The detailed description includes details for the purpose of providing a thorough understanding of the various concepts. However, it will be apparent to those skilled in the art that these concepts may be practiced without these details. In some instances, well-known structures and components are shown in block diagram form in order to avoid obscuring such concepts.

Various methods, apparatuses, devices, and systems are described for performing half/full-duplex operations by using multiple connections in carrier aggregation or a multiple connectivity communication mode. In some aspects, a wireless device (e.g., user equipment (UE)) can communicate with the multiple cells configured by multiple network entities using multiple connectivity communication mode, which may include receiving resources from each of the multiple network entities, over which the wireless device can communicate in accessing a wireless network. In some aspects, a wireless device may receive first configuration information to communicate with a first network entity (e.g., a master eNodeB, also referred to as a MeNodeB or MeNB) through a first primary cell (e.g., a master cell group primary cell or PCell) of the first network entity. The wireless device may receive second configuration information to communicate with a second network entity (e.g., a secondary eNodeB, also referred to as an SeNodeB or SeNB) through a second primary cell (e.g., a secondary cell group primary cell or $PCell_{SCG}$) of the second network entity. For each of the first primary cell and the second primary cell, the wireless device may determine whether to perform half-duplex operation or full-duplex operation based at least in part on the first configuration information and the second configuration information, respectively. The second network entity may be non-collocated with the first network entity, collocated with the first network entity, and/or may be the same as the first network entity (e.g., in carrier aggregation with a single eNodeB).

In some aspects of multiple connectivity wireless communications, a wireless device may be communicatively coupled to a plurality of network entities. For example, a first network entity (e.g., a master eNodeB, also referred to as an MeNodeB or MeNB) may be configured to operate a master cell group (MCG) including one or more cells (e.g., each cell may operate in different frequency bands and may include one or more component carriers (CCs)). A cell in the master cell group (MCG) may be configured as a first primary cell (e.g., $PCell_{MCG}$) of the master cell group (MCG). A second network entity (e.g., SeNodeB or SeNB) may be configured to operate a secondary cell group (SCG) including one or more cells (e.g., each cell may operate in different frequency bands and may include one or more CCs). A cell in the secondary cell group (SCG) may be designated as a first primary cell (e.g., $PCell_{SCG}$) of the secondary cell group (SCG). For example, the wireless device may receive configuration information from the first network entity via the first primary cell (e.g., $PCell_{MCG}$) and configuration information from the second network entity via the second primary cell (e.g., $PCell_{SCG}$). The first network entity may be non-collocated with the second network entity, collocated with the first network entity, and/or may be the same as the first network entity (e.g., in carrier aggregation with a single eNodeB).

In an aspect, carrier aggregation may be enabled within each of cells or cell groups configured by the MeNB and SeNB and/or related cells, and the wireless device may perform half-duplex or full-duplex operations with one or more of the cells or cell groups configured by the MeNB and SeNB based on at least one of the given carrier aggregation band configuration for the wireless device with the respective eNB and/or wireless device capabilities given the carrier aggregation band configuration. In addition, the wireless device may be able to perform full-duplex operations in this configuration even where only half-duplex operations can be performed with the cells or cell groups configured by the MeNB and/or SeNB individually because when considered across the MeNB and SeNB, the wireless device may contemporaneously transmit to one eNB and receive from the other eNB in a given time interval. It is to be appreciated that a wireless device can also operate as full-duplex in carrier aggregation with a single eNB where multiple carriers or groups of carriers of the aggregated carriers can have dedicated band configurations that may allow for half-duplex operations.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of UMTS. 3GPP LTE and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 is a block diagram conceptually illustrating an example of a wireless communications system 100, in accordance with an aspect of the present disclosure. The wireless communications system 100 includes base stations (or cells) 105, user equipment (UEs) 115, and a core network 130. The base stations 105 may communicate with the UEs 115 under the control of a base station controller (not shown), which may be part of the core network 130 or the base stations 105 in various embodiments. One or more UEs 115 can include a communicating component 640 for performing half/full-duplex operations in multiple connectivity wireless communications and/or carrier aggregation (with one or more base stations), as described herein. The base stations 105 may communicate control information and/or user data with the core network 130 through first backhaul links 132. In embodiments, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The wireless communications system 100 may also support operation on multiple flows at the same time. In some aspects, the multiple flows may correspond to multiple wireless wide area networks (WWANs) or cellular flows. In other aspects, the multiple flows may correspond to a combination of WWANs or cellular flows and wireless local area networks (WLANs) or Wi-Fi flows.

The base stations 105 may wirelessly communicate with the UEs 115 via one or more base station antennas. Each of the base stations 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies.

In implementations, the wireless communications system 100 is an LTE/LTE-A network communication system. In LTE/LTE-A network communication systems, the terms evolved Node B (eNodeB) may be used to describe the base stations 105. The wireless communications system 100 may be a Heterogeneous LTE/LTE-A network in which different types of eNodeBs provide coverage for various geographical regions. For example, each eNodeB 105 may provide communication coverage for a macro cell, a pico cell, a femto cell, and/or other types of cell. A macro cell may cover a relatively large geographic area (e.g., several kilometers in radius) and may allow unrestricted access by UEs 115 with service subscriptions with the network provider. A pico cell may cover a relatively smaller geographic area (e.g., buildings) and may allow unrestricted access by UEs 115 with service subscriptions with the network provider. A femto cell may also cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells. The wireless communications system 100 may support use of LTE and WLAN or Wi-Fi by one or more of the UEs 115.

The core network 130 may communicate with the eNodeBs 105 or other base stations 105 via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNodeBs, pico eNodeBs, femto eNodeBs, relays, and the like.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

In certain aspects of the wireless communications system 100, a UE 115 may be configured to support carrier aggregation (CA) with two or more eNodeBs 105. The eNodeBs 105 that are used for carrier aggregation may be collocated or may be connected through fast connections. In either case, coordinating the aggregation of component carriers (CCs) for wireless communications between the UE 115 and the eNodeBs 105 may be carried out more easily because information can be readily shared between the various cells being used to perform the carrier aggregation. When the eNodeBs 105 that are used for carrier aggregation are non-collocated (e.g., far apart or do not have a high-speed connection between them), then coordinating the aggregation of component carriers may involve additional aspects. For example, in carrier aggregation for dual connectivity (e.g., UE 115 connected to two non-collocated eNodeBs 105), the UE 115 may receive configuration information to communicate with a first eNodeB 105 (e.g., SeNodeB or SeNB) through a primary cell of the first eNodeB 105. The first eNodeB 105 may include a group of cells referred to as a secondary cell group or SCG, which includes one or more secondary cells and the primary cell or $PCell_{SCG}$ of the first eNodeB 105. The UE 115 may also receive configuration information to communicate with a second eNodeB 105 (e.g., MeNodeB or MeNB) through a second primary cell of the second eNodeB 105. The second eNodeB 105 may include a group of cells referred to as a master cell group or MCG, which includes one or more secondary cells and the primary cell or PCell of the second eNodeB 105.

In certain aspects of the wireless communications system 100, carrier aggregation for dual connectivity may involve having a secondary eNodeB 105 (e.g., SeNodeB or SeNB) be configured to operate one of its cells as a $PCell_{SCG}$. The secondary eNodeB 105 may transmit, to a UE 115, configuration information through the $PCell_{SCG}$ for the UE 115 to communicate with the secondary eNodeB 105 while the UE 115 is in communication with a master eNodeB 105 (e.g., MeNodeB or MeNB). The master eNodeB 105 may transmit, to the same UE 115, configuration information via its PCell for that UE 115 to communication with the other eNodeB 105. The two eNodeBs 105 may be non-collocated.

In examples described herein, a UE 115 may be configured with a CA band from eNodeBs 105. For example, communicating component 640 can receive the configuration from one or more of the eNodeBs 105, and/or can utilize the configuration in communicating with one or more of the eNodeBs 105, as described herein. Based on the CA band configuration, and/or UE 115 capabilities, the UE 115 can perform half-duplex or full-duplex operations with the eNodeBs 105. In addition, in some examples, the UE 115 can perform full-duplex operations over the network when half-duplex operations are supported by the eNodeBs 105 by using a connection with at least one of multiple the eNodeBs 105 for transmitting wireless network communications in a given time interval while using a connection with at least another one of the multiple eNodeBs 105 for receiving wireless network communications in the given time interval. In addition, in an example, where one of the eNodeBs 105 is a small cell capable of receiving transmission from the UE 115 under a threshold transmit power, the UE 115 can configure full-duplex operations over the connection with the small cell eNodeB 105 by transmitting to the small cell eNodeB 105 using a transmit power below the threshold.

Figure 2:
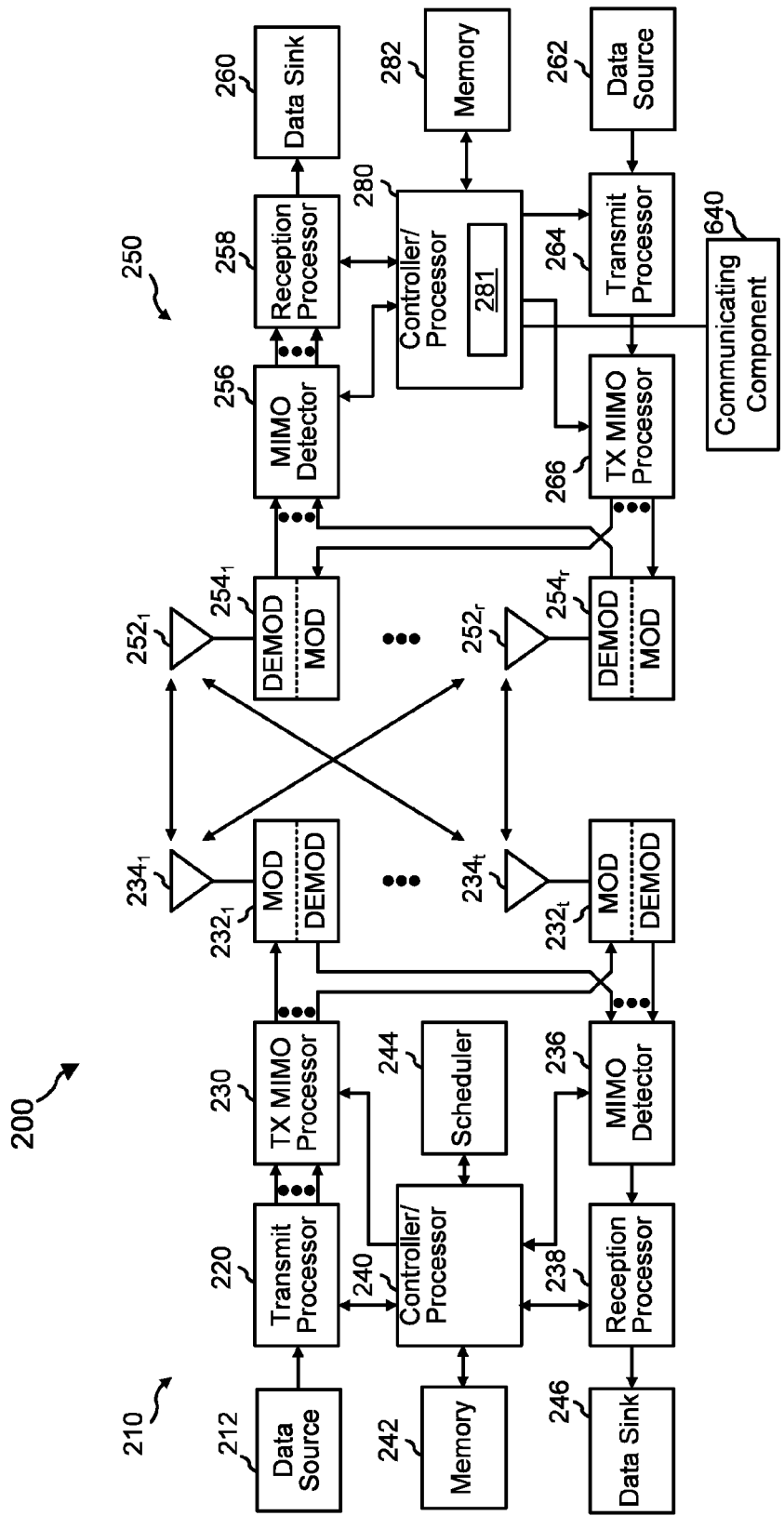
FIG. 2 is a block diagram conceptually illustrating examples of an eNodeB and a UE configured in accordance with an aspect of the present disclosure.

FIG. 2 is a block diagram conceptually illustrating examples of an eNodeB 210 and a UE 250 configured in accordance with an aspect of the present disclosure. For example, the base station/eNodeB 210 and the UE 250 of a system 200, as shown in FIG. 2, may be one of the base stations/eNodeBs and one of the UEs in FIG. 1, respectively. UE 250 may accordingly include a communicating component 640 for performing half/full-duplex operations in multiple connectivity wireless communications and/or carrier aggregation (with one or more eNBs 210), as described herein. In some aspects, the eNodeB 210 may support carrier aggregation and/or multiple connectivity (e.g., dual connectivity) carrier aggregation. For example, the eNodeB 210 may be an MeNodeB or MeNB having one of the cells in its MCG configured as a PCell, may be an SeNodeB or SeNB having one of its cells in its SCG configured as a $PCell_{SCG}$, may have one of the cells in its MCG/SCG configured as an SCell, etc. In some aspects, the UE 250 may also support carrier aggregation, multiple connectivity carrier aggregation, etc. The UE 250 may receive configuration information from the eNodeB 210 via the PCell and/or the $PCell_{SCG}$, which may relate to a band configuration based on one or more capabilities indicated by the UE 250, as described further herein. The base station 210 may be equipped with antennas $234_{1-t}$, and the UE 250 may be equipped with antennas $252_{1-r}$, wherein t and r are integers greater than or equal to one.

At the base station 210, a base station transmit processor 220 may receive data from a base station data source 212 and control information from a base station controller/processor 240. The control information may be carried on the PBCH, PCFICH, physical hybrid automatic repeat/request (HARQ) indicator channel (PHICH), PDCCH, etc. The data may be carried on the PDSCH, etc. The base station transmit processor 220 may process (e.g., encode and symbol map) the data and control information to obtain data symbols and control symbols, respectively. The base station transmit processor 220 may also generate reference symbols, e.g., for the PSS, SSS, and cell-specific reference signal (RS). A base station transmit (TX) multiple-input multiple-output (MIMO) processor 230 may perform spatial processing (e.g., precoding) on the data symbols, the control symbols, and/or the reference symbols, if applicable, and may provide output symbol streams to the base station modulators/demodulators (MODs/DEMODs) $232_{1-t}$. Each base station modulator/demodulator 232 may process a respective output symbol stream (e.g., for OFDM, etc.) to obtain an output sample stream. Each base station modulator/demodulator 232 may further process (e.g., convert to analog, amplify, filter, and upconvert) the output sample stream to obtain a downlink signal. Downlink signals from modulators/demodulators $232_{1-t}$ may be transmitted via the antennas $234_{1-t}$, respectively.

At the UE 250, the UE antennas $252_{1-r}$ may receive the downlink signals from the base station 210 and may provide received signals to the UE modulators/demodulators (MODs/DEMODs) $254_{1-r}$, respectively. Each UE modulator/demodulator 254 may condition (e.g., filter, amplify, downconvert, and digitize) a respective received signal to obtain input samples. Each UE modulator/demodulator 254 may further process the input samples (e.g., for OFDM, etc.) to obtain received symbols. A UE MIMO detector 256 may obtain received symbols from all the UE modulators/demodulators $254_{1-r}$, and perform MIMO detection on the received symbols if applicable, and provide detected symbols. A UE reception processor 258 may process (e.g., demodulate, deinterleave, and decode) the detected symbols, provide decoded data for the UE 250 to a UE data sink 260, and provide decoded control information to a UE controller/processor 280.

On the uplink, at the UE 250, a UE transmit processor 264 may receive and process data (e.g., for the PUSCH) from a UE data source 262 and control information (e.g., for the PUCCH) from the UE controller/processor 280. The UE transmit processor 264 may also generate reference symbols for a reference signal. The symbols from the UE transmit processor 264 may be precoded by a UE TX MIMO processor 266 if applicable, further processed by the UE modulator/demodulators $254_{1-r}$ (e.g., for SC-FDM, etc.), and transmitted to the base station 210. At the base station 210, the uplink signals from the UE 250 may be received by the base station antennas 234, processed by the base station modulators/demodulators 232, detected by a base station MIMO detector 236 if applicable, and further processed by a base station reception processor 238 to obtain decoded data and control information sent by the UE 250. The base station reception processor 238 may provide the decoded data to a base station data sink 246 and the decoded control information to the base station controller/processor 240.

The base station controller/processor 240 and the UE controller/processor 280 may direct the operation at the base station 210 and the UE 250, respectively. The UE controller/processor 280 and/or other processors and modules at the UE 250 may also perform or direct, e.g., the execution of the functional blocks illustrated in FIG. 6, and/or other processes for the techniques described herein (e.g., flowcharts illustrated in FIG. 7). In some aspects, at least a portion of the execution of these functional blocks and/or processes may be performed by block 281 in the UE controller/processor 280. The base station memory 242 and the UE memory 282 may store data and program codes for the base station 210 and the UE 250, respectively. For example, the UE memory 282 may store configuration information for multiple connectivity wireless communications provided by the base station 210 and/or another base station. A scheduler 244 may be used to schedule UE 250 for data transmission on the downlink and/or uplink.

In one configuration, the UE 250 may include means for communicating with a first cell served by a first access point over a first connection. The UE 250 may also include means for communicating with a second cell served by a second access point over a second connection. The UE 250 may further include means for determining whether to perform a half-duplex operation or a full-duplex operation for communicating with the first cell served by the first access point over the first connection. The UE 250 can also include means for determining whether to perform a half-duplex operation or a full-duplex operation for communicating with the second cell served by the second access point over the second connection. In one aspect, the aforementioned means may be the UE controller/processor 280, the UE memory 282, the UE reception processor 258, the UE MIMO detector 256, the UE modulators/demodulators 254, and the UE antennas 252 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 6.

Figure 3:
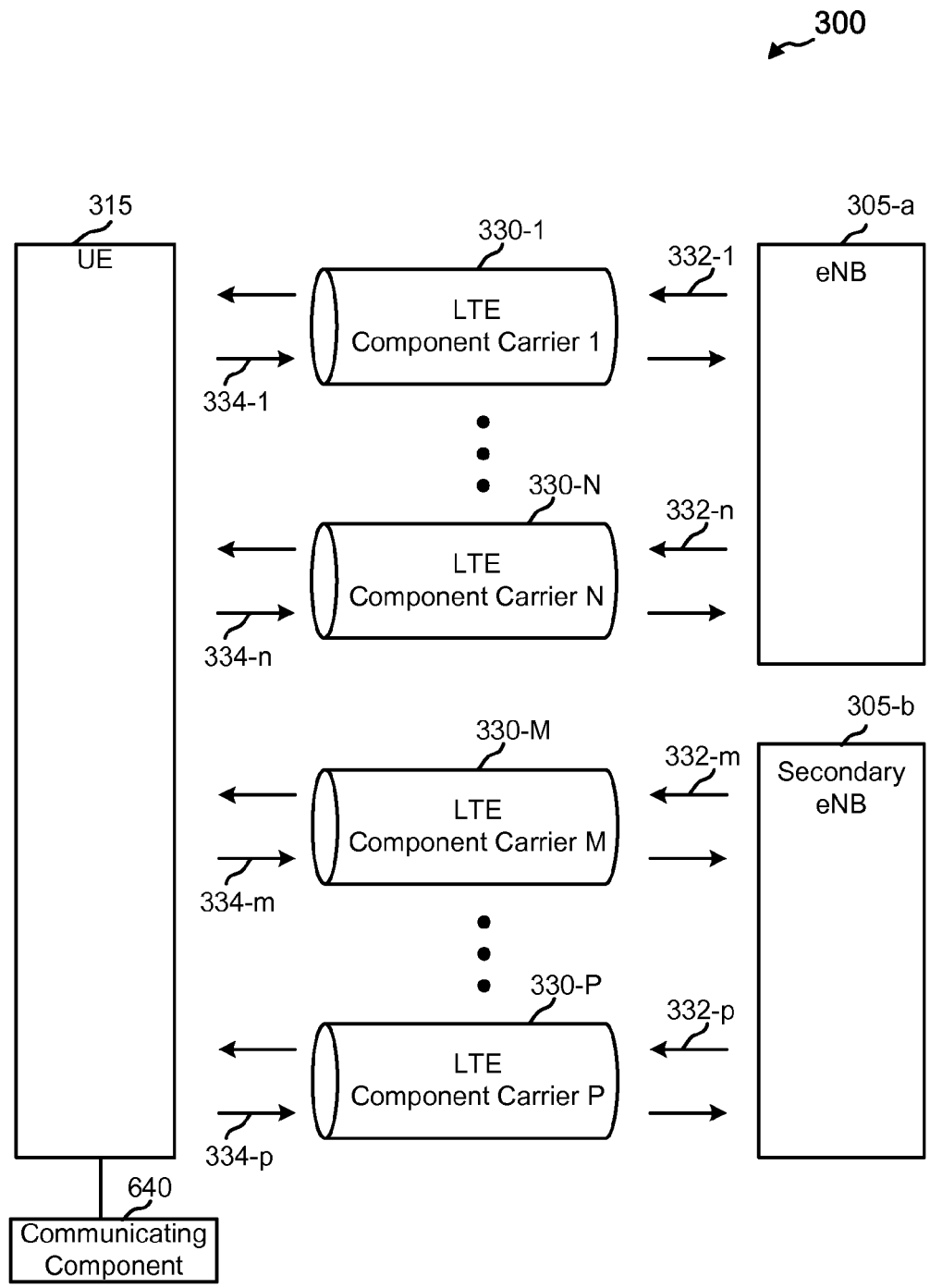
FIG. 3 is a block diagram conceptually illustrating an aggregation of radio access technologies at a UE, in accordance with an aspect of the present disclosure.

FIG. 3 is a block diagram conceptually illustrating an aggregation of carriers and/or connections at a UE, in accordance with an aspect of the present disclosure. The aggregation may occur in a system 300 including a multi-mode UE 315, which can communicate with an eNodeB 305-a using one or more component carriers 1 through N ($CC_1$-$CC_N$), and/or with a secondary eNB 305-b using one or more component carriers M through P ($CC_M$-$CC_P$). For example, the eNodeB 305-a and/or secondary eNB 305-b may include an AP, femto cell, pico cell, etc. UE 315 may include a communicating component 640 for performing half/full-duplex operations in multiple connectivity wireless communications and/or carrier aggregation (with one or more eNBs 210), as described herein. UE 315 may be a multi-mode UE in this example that supports more than one radio access technology (RAT). For example, the UE 315 may support at least a WWAN radio access technology (e.g., LTE) and/or a WLAN radio access technology (e.g., Wi-Fi). A multi-mode UE may also support carrier aggregation and/or multiple connectivity carrier aggregation, as described herein. The UE 315 may be an example of one of the UEs of FIG. 1, FIG. 2, FIG. 4a, FIG. 4b, FIG. 5, FIG. 6. The eNodeB 305-a and/or secondary eNB 305-b may be an example of one of the eNodeBs or base stations of FIG. 1, FIG. 2, FIG. 4a, FIG. 4b, FIG. 5, FIG. 6. While only one UE 315, one eNodeB 305-a, and one secondary eNB 305-b are illustrated in FIG. 3, it will be appreciated that the system 300 can include any number of UEs 315, eNodeBs 305-a, and/or secondary eNBs 305-b. In one example, UE 315 can communicate with one eNB 305-a over one or more LTE component carriers 330-1 to 330-N while communicating with another eNB 305-b over another one or more LTE component carriers 330-M to 330-P.

The eNodeB 305-a can transmit information to the UE 315 over forward (downlink) channels 332-1 through 332-N on LTE component carriers $CC_1$ through $CC_N$ 330. In addition, the UE 315 can transmit information to the eNodeB 305-a over reverse (uplink) channels 334-1 through 334-N on LTE component carriers $CC_1$ through $CC_N$. Similarly, the eNodeB 305-b may transmit information to the UE 315 over forward (downlink) channels 332-m through 332-p on LTE component carriers $CC_M$ through $CC_P$ 330. In addition, the UE 315 may transmit information to the eNodeB 305-b over reverse (uplink) channels 334-m through 334-p on LTE component carriers $CC_M$ through $CC_P$ 330.

In describing the various entities of FIG. 3, as well as other figures associated with some of the disclosed embodiments, for the purposes of explanation, the nomenclature associated with a 3GPP LTE or LTE-A wireless network is used. However, it is to be appreciated that the system 300 can operate in other networks such as, but not limited to, an OFDMA wireless network, a CDMA network, a 3GPP2 CDMA2000 network and the like.

In multi-carrier operations, the downlink control information (DCI) messages associated with different UEs 315 can be carried on multiple component carriers. For example, the DCI on a PDCCH can be included on the same component carrier that is configured to be used by a UE 315 for physical downlink shared channel (PDSCH) transmissions (i.e., same-carrier signaling). Alternatively, or additionally, the DCI may be carried on a component carrier different from the target component carrier used for PDSCH transmissions (i.e., cross-carrier signaling). In some implementations, a carrier indicator field (CIF), which may be semi-statically enabled, may be included in some or all DCI formats to facilitate the transmission of PDCCH control signaling from a carrier other than the target carrier for PDSCH transmissions (cross-carrier signaling).

In the present example, the UE 315 may receive data from one eNodeB 305-*a*. However, users on a cell edge may experience high inter-cell interference which may limit the data rates. Multiflow allows UEs to receive data from two eNodeBs 305-*a* and 305-*b* concurrently. In some aspects, the two eNodeBs 305-*a* may be non-collocated and may be configured to support multiple connectivity carrier aggregation. Multiflow works by sending and receiving data from the two eNodeBs 305-*a*/305-*b* in two totally separate streams when a UE is in range of two cell towers in two adjacent cells at the same time (see FIG. 5 below). The UE talks to two eNodeB 305-*a* and/or 305-*b* simultaneously when the device is on the edge of either eNodeBs' reach. By scheduling two independent data streams to the mobile device from two different eNodeBs at the same time, multiflow exploits uneven loading in the wireless communication networks. This helps improve the cell edge user experience while increasing network capacity. In one example, throughput data speeds for users at a cell edge may double. In some aspects, multiflow may also refer to the ability of a UE to talk to a WWAN tower (e.g., cellular tower) and a WLAN tower (e.g., AP) simultaneously when the UE is within the reach of both towers. In such cases, the towers may be configured to support carrier aggregation through multiple connections when the towers are not collocated.

Figure 4A:
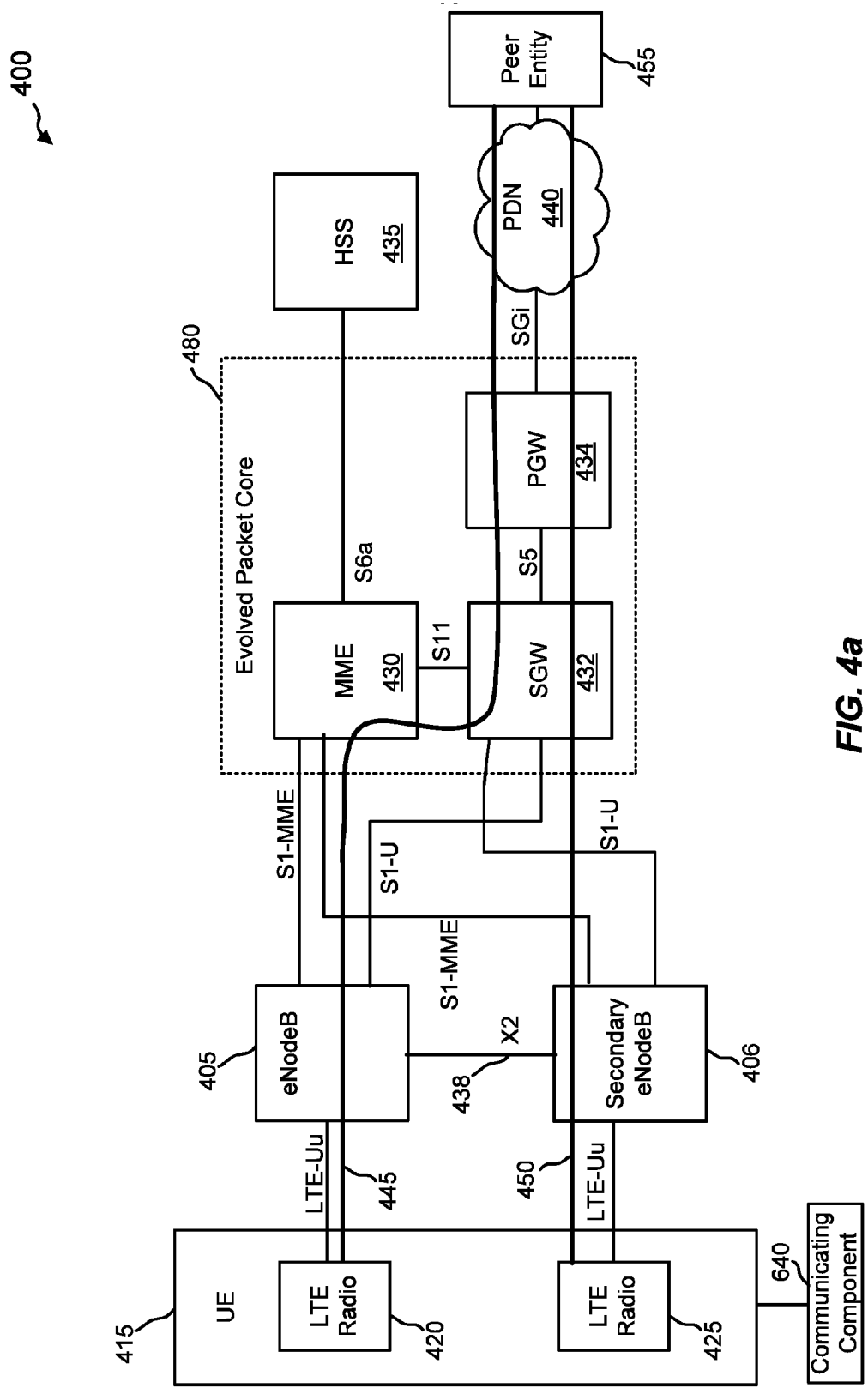
FIGS. 4a and 4b are block diagrams conceptually illustrating an example of data paths between a UE and a PDN in accordance with an aspect of the present disclosure.

FIG. 4*a* is a block diagram conceptually illustrating an example of data paths 445 and 450 between a UE 415 and a PDN 440 (e.g., Internet or one or more components to access the Internet) in accordance with an aspect of the present disclosure. The data paths 445, 450 are shown within the context of a wireless communications system 400 for aggregating data from different eNodeBs 405 and 406, which may or may not use the same RAT. The system 200 of FIG. 2 may be an example of portions of the wireless communications system 400. The wireless communications system 400 may include a multi-mode UE 415, an eNodeB 405, secondary eNodeB 406 that can be coupled to the eNodeB 405 via a backhaul link 438 (e.g., based on a X2 interface), an evolved packet core (EPC) 480, a PDN 440, and a peer entity 455. The UE 415 may include a communicating component 640 for performing half/full-duplex operations in multiple connectivity wireless communications and/or carrier aggregation (with one or more base stations), as described herein. The multi-mode UE 415 may be configured to support carrier aggregation, multiple connectivity (e.g., dual connectivity) carrier aggregation, and/or the like. The EPC 480 may include a mobility management entity (MME) 430, a serving gateway (SGW) 432, and a PDN gateway (PGW) 434. A home subscriber system (HSS) 435 may be communicatively coupled with the MME 430. The UE 415 may include an LTE radio 420 and an LTE radio 425. These elements may represent aspects of one or more of their counterparts described above with reference to the previous or subsequent Figures. For example, the UE 415 may be an example of UEs in FIG. 1, FIG. 2, FIG. 3, FIG. 5, FIG. 6, the eNodeB 405 may be an example of the eNodeBs/base stations of FIG. 1, FIG. 2, FIG. 3, FIG. 5, FIG. 6, the eNB 406 may be an example of the secondary eNB 305-*b* of FIG. 3, and/or the EPC 480 may be an example of the core network 130 of FIG. 1. The eNodeBs 405 and/or 406 in FIG. 4*a* may be not be collocated or otherwise may not be in high-speed communication with each other. In addition, in an example, eNodeBs 405 and 406 may communicate with different EPCs 480.

Referring back to FIG. 4*a*, the eNodeB 405 and/or 406 may be capable of providing the UE 415 with access to the PDN 440 using the aggregation of one or more LTE component carriers (e.g., with one or more eNodeBs). Accordingly, the UE 415 may involve carrier aggregation in dual connectivity, where one connection is to one network entity (eNodeB 405) and the other connection is to a different network entity (eNodeB 406). It is to be appreciated that UE 415 can communicate with additional eNodeBs 405 and/or 406 via additional data paths 445, 450 that traverse the EPC 408 or not to access PDN 440 to provide multiple connectivity wireless communications with multiple NodeBs, carrier aggregation with multiple cells of an eNodeB, etc. Using this access to the PDN 440, the UE 415 may communicate with the peer entity 455. The eNodeB 405 and/or 406 may provide access to the PDN 440 through the EPC 480 (e.g., through data path 445), and the eNodeB 406 may provide direct access to the PDN 440 (e.g., through data path 450). In the depicted example, the UE 415 can communicate with eNodeB 405 as a MeNodeB and the eNodeB 406 as SeNodeB over eNodeB-specific bearers. In an example, eNodeBs 405 and 406 can communicate with one another over an X2 connection 438 to aggregate UE 415 communications for providing the EPC 480. In this example, UE 415 can access the PDN 440 by using the bearer with eNodeB 405 and/or secondary eNodeB 406, which can map communications over the data paths 445 and 450 to access the PDN 440. Moreover, in this example, MeNodeB 405 can provide UE-specific upper layer functionalities to the UE 415, such as non-access stratum (NAS) functions including NAS security, NAS mobility functions, etc. In addition, in this example, the SeNodeB 406 can carry PUCCH for the SCG and provide other PCell-like lower layer functionalities for the SCG. Thus, the UE 415 can independently communicate with MeNodeB 405 and SeNodeB 406, which may give rise to a situation in which the UE 415 is configured for half duplex communications with one or both of MeNodeB 405 and SeNodeB 406, but may be performing full duplex communications with the MeNodeB 405 and SeNodeB 406 when considered together based on separate band configurations for MeNodeB 405 and SeNodeB 406.

The MME 430 may be the control node that processes the signaling between the UE 415 and the EPC 480. The MME 430 may provide bearer and connection management. The MME 430 may, therefore, be responsible for idle mode UE tracking and paging, bearer activation and deactivation, and SGW selection for the UE 415. The MME 430 may communicate with the eNodeBs 405 and/or 406 over an S1-MME interface. The MME 430 may additionally authenticate the UE 415 and implement Non-Access Stratum (NAS) signaling with the UE 415.

The HSS 435 may, among other functions, store subscriber data, manage roaming restrictions, manage accessible access point names (APNs) for a subscriber, and associate subscribers with MMEs 430. The HSS 435 may communicate with the MME 430 over an S6a interface defined by the Evolved Packet System (EPS) architecture standardized by the 3 GPP organization.

All user IP packets transmitted over LTE may be transferred through eNodeBs 405 and/or 406 to the SGW 432, which may be connected to the PGW 434 over an S5 signaling interface and the MME 430 over an S11 signaling interface. The SGW 432 may reside in the user plane and act as a mobility anchor for inter-eNodeB handovers and handovers between different access technologies. The PGW 434 may provide UE IP address allocation as well as other functions.

The PGW 434 may provide connectivity to one or more external packet data networks, such as PDN 440, over an SGi signaling interface. The PDN 440 may include the Internet, an Intranet, an IP Multimedia Subsystem (IMS), a Packet-Switched (PS) Streaming Service (PSS), and/or other types of PDNs.

In the present example, user plane data between the UE 415 and the EPC 480 may traverse the same set of one or more EPS bearers, irrespective of whether the traffic flows over data path 445 of the LTE link or data path 450. Signaling or control plane data related to the set of one or more EPS bearers may be transmitted between the LTE radio 420 of the UE 415 and the MME 430 of the EPC 480, by way of the eNodeBs 405 and/or 406.

While aspects of FIG. 4a have been described with respect to LTE, similar aspects regarding aggregation and/or multiple connections may also be implemented with respect to UMTS or other similar system or network wireless communications radio technologies.

Figure 4B:
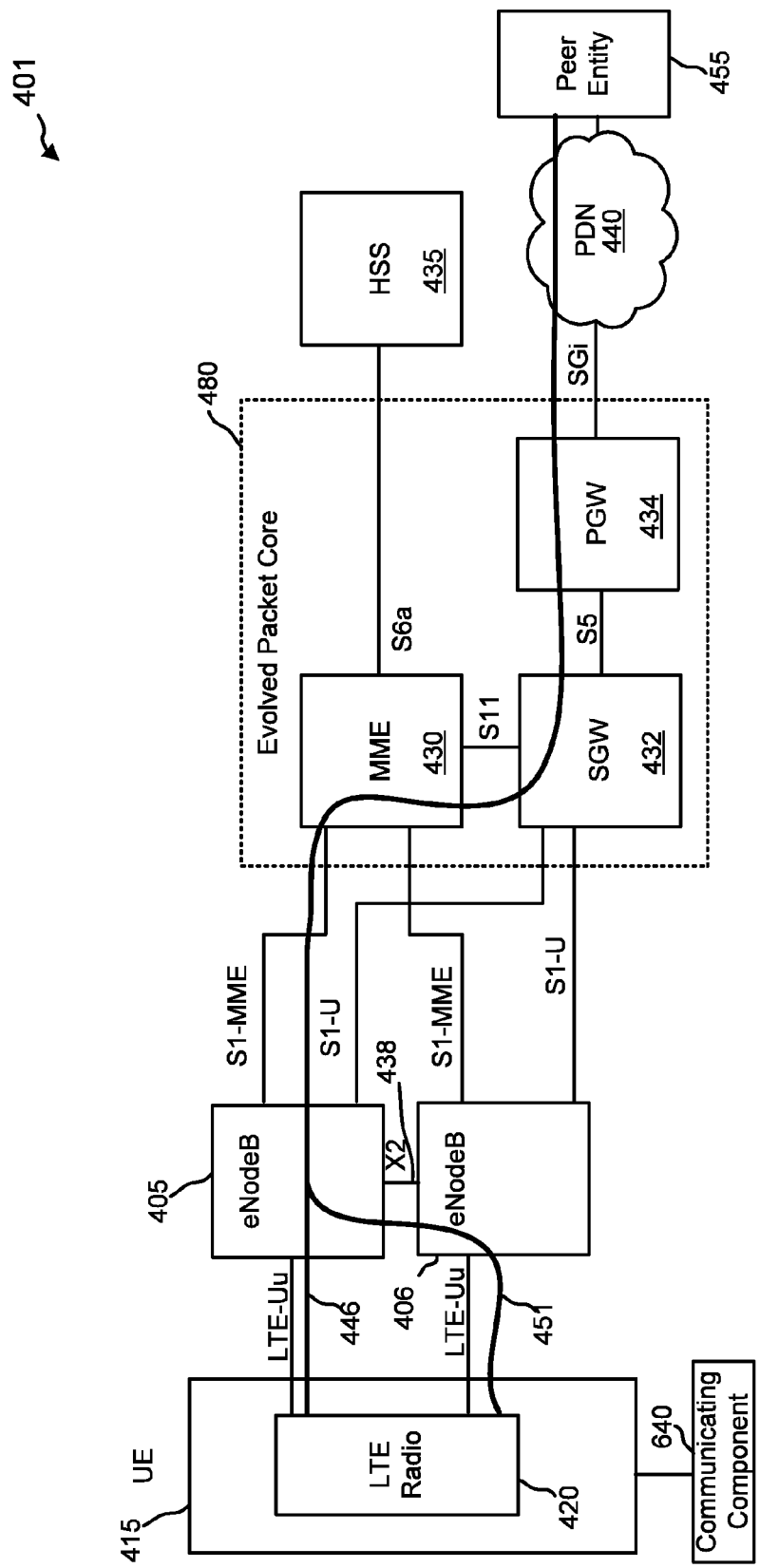

FIG. 4b is a block diagram conceptually illustrating an example of data paths 446 and 451 between the UE 415 and the EPC 480 in accordance with an aspect of the present disclosure. The data paths 446, 451 are shown within the context of a wireless communications system 401 for aggregating data of a split bearer for transmitting using resources of multiple eNodeBs 405, 406. This can be an alternative bearer configuration to that shown in FIG. 4a, for example, having data path 445 that traverses eNodeB 405 and/or data path 450 that traverses eNodeB 406. The system 200 of FIG. 2 may be an example of portions of the wireless communications system 401. The wireless communications system 401 may include a UE 415, eNodeB 405, eNodeB 406, an evolved packet core (EPC) 480, a PDN 440, and a peer entity 455. The UE 415 may include a communicating component 640 for performing half/full-duplex operations in multiple connectivity wireless communications and/or carrier aggregation (with one or more base stations), as described herein. The UE 415 may be configured to support carrier aggregation, multiple connectivity (e.g., dual connectivity) carrier aggregation, etc. It is to be appreciated that the UE 415 can be a multi-mode UE that can communicate with eNodeBs 405 and/or 406 along with a WLAN AP (not shown for ease of explanation). The EPC 480 may include a mobility management entity (MME) 430, a serving gateway (SGW) 432, and a PDN gateway (PGW) 434. A home subscriber system (HSS) 435 may be communicatively coupled with the MME 430. The UE 415 may include an LTE radio 420, though it is to be appreciated that LTE radio 420 can comprise one or more radios (e.g., LTE radios 420, 425 in FIG. 4a). These elements may represent aspects of one or more of their counterparts described above with reference to the previous or subsequent Figures. For example, the UE 415 may be an example of UEs in FIG. 1, FIG. 2, FIG. 3, FIG. 5, FIG. 6, the eNodeBs 405, 406 may be an example of the eNodeBs/base stations of FIG. 1, FIG. 2, FIG. 3, FIG. 5, FIG. 6, and/or the EPC 480 may be an example of the core network 130 of FIG. 1. The eNodeBs 405, 406 in FIG. 4b may or may not be collocated.

Referring back to FIG. 4b, the eNodeBs 405, 406 may be capable of providing the UE 415 with access to the PDN 440 over separate uplink resource grants, which may relate to one or more LTE component carriers, as described. Accordingly, the UE 415 may involve carrier aggregation in dual connectivity, where one connection is to one network entity (eNodeB 405) and the other connection is to a different network entity (eNodeB 406). Using this access to the PDN 440, the UE 415 may communicate with the peer entity 455. UE 415 can establish a split bearer that uses connections with eNodeB 405 and eNodeB 406 to access the PDN 440 through the EPC 480. In the depicted example, the split bearer is provided in coordination with the eNodeB 405 as a MeNodeB and the eNodeB 406 as SeNodeB. Thus, for example, the eNodeBs 405 and 406 can communicate with one another over an X2 interface 438 to aggregate UE 415 communications for providing the EPC 480. For example, MeNodeB 405 can aggregate communications at a common packet data convergence protocol (PDCP) layer at MeNodeB 405. For example, the carrier(s) between UE 415 and MeNodeB 405 can have an independent physical (PHY), MAC, RLC, etc. layer from the carriers) between UE 415 and SeNodeB 406), and the MeNodeB 405 can aggregate communications received over the independent PHY, MAC, RLC, etc. layers from the various carriers at the common PDCP layer.

In this example, UE 415 can access the PDN 440 by using the split bearer, which can map communications over the data paths 446 and 451 to access the PDN 440. Moreover, in this example, MeNodeB 405 can provide UE-specific upper layer functionalities to the UE 415, such as non-access stratum (NAS) functions including NAS security, NAS mobility functions, etc. In addition, in this example, the SeNodeB 406 can carry PUCCH for the SCG and provide other PCell-like lower layer functionalities for the SCG. Thus, the UE 415 can independently communicate with MeNodeB 405 and SeNodeB 406, which may give rise to a situation in which the UE 415 is configured for half duplex communications with one or both of MeNodeB 405 and SeNodeB 406, but may be performing full duplex communications with the MeNodeB 405 and SeNodeB 406 when considered together based on separate band configurations for MeNodeB 405 and SeNodeB 406.

The MME 430 may be the control node that processes the signaling between the UE 415 and the EPC 480, as described. The MME 430 may provide bearer and connection management for establishing and managing connectivity of the split bearer. The MME 430 may, therefore, be responsible for idle mode UE tracking and paging, bearer activation and deactivation, and SGW selection for the UE 415. The MME 430 may communicate with the eNodeBs 405 and 406 over an S1-MME interface. The MME 430 may additionally authenticate the UE 415 and implement Non-Access Stratum (NAS) signaling with the UE 415, as described.

All user IP packets transmitted over LTE may be transferred through eNodeB 405 or eNodeB 406 to the SGW 432, which may be connected to the PDN gateway 434 over an S5 signaling interface and the MME 430 over an S11 signaling interface. In one example, as shown, the MME 430 can aggregate data received over the data paths 446 and 451 based on the data being associated with the same split bearer, and can provide the aggregated data on to the SGW 432 for further processing.

Thus, in the present example, user plane data between the UE 415 and the EPC 480 may traverse the split bearer, which may be an EPS bearer, over resources granted by one or more of the eNodeB 405 and 406. Signaling or control plane data related to the set of one or more EPS bearers may be transmitted between the LTE radio 420 of the UE 415 and the MME 430 of the EPC 480, by way of the eNodeB 405 or eNodeB 406, and may include eNodeB specific control plane data or bearer related control plane data.

While aspects of FIG. 4b have been described with respect to LTE, similar aspects regarding aggregation and/or multiple connections may also be implemented with respect to UMTS or other similar system or network wireless communications radio technologies.

Figure 5:
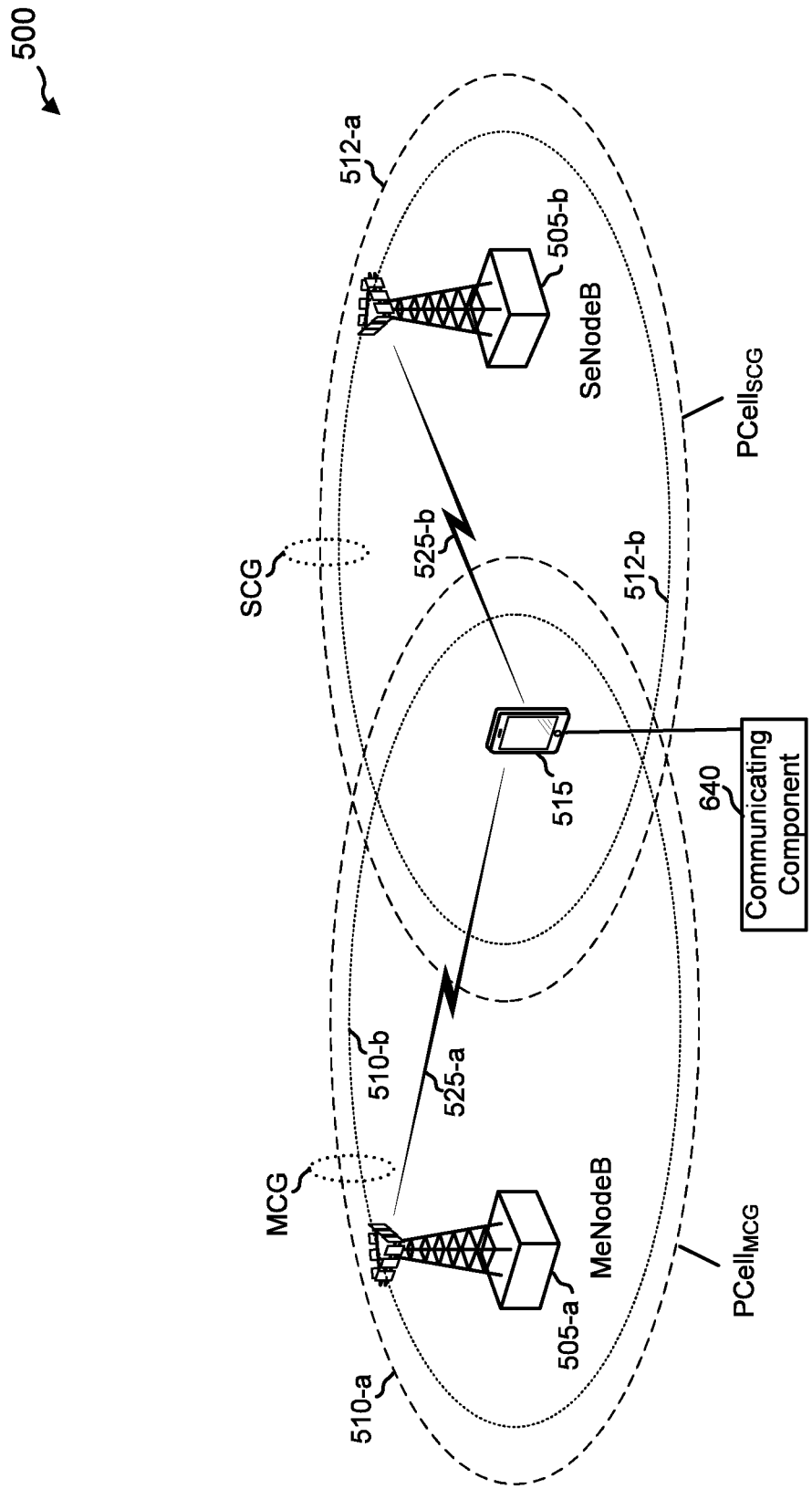
FIG. 5 is a block diagram conceptually illustrating an example wireless communication system that facilitates multiple connectivity carrier aggregation in accordance with an aspect of the present disclosure.

FIG. 5 is a diagram conceptually illustrating multiple connectivity carrier aggregation in accordance with an aspect of the present disclosure. A wireless communications system 500 may include a master eNodeB 505-a (MeNodeB or MeNB) having a set or group of cells referred to as a master cell group or MCG that may be configured to serve the UE 515. The MCG may include one primary cell ($PCell_{MCG}$) 510-a and one or more secondary cells 510-b (only one is shown). The wireless communications system 500 may also include a secondary eNodeB 505-b (SeNodeB or SeNB) having a set or group of cells referred to as a secondary cell group or SCG that may be configured to serve the UE 515. The SCG may include one primary cell ($PCell_{SCG}$) 512-a and one or more secondary cells 512-b (only one is shown). Also shown is a UE 515 that supports carrier aggregation for multiple connectivity wireless communications (e.g., dual connectivity). The UE 515 may communicate with the MeNodeB 505-a, or a related $PCell_{MCG}$, via communication link 525-a and with the SeNodeB 505-b, or a related $PCell_{SCG}$, via communication link 525-b. In addition, the UE 515 may include a communicating component 640 for performing half/full-duplex operations in multiple connectivity wireless communications and/or carrier aggregation (with one or more base stations), as described herein.

In an example, the UE 515 may aggregate component carriers from the same eNodeB or may aggregate component carriers from collocated or non-collocated eNodeBs. In such an example, the various cells (e.g., different component carriers (CCs)) being used can be easily coordinated because they are either handled by the same eNodeB or by eNodeBs that can communicate control information. When the UE 515, as in the example of FIG. 5, performs carrier aggregation when in communication with two eNodeBs that are non-collocated, then the carrier aggregation operation may be different due to various network conditions. In this case, establishing a primary cell ($PCell_{SCG}$) in the secondary eNodeB 505-b may allow for appropriate configurations and controls to take place at the UE 515 even though the secondary eNodeB 505-b is non-collocated with the primary eNodeB 505-a.

In the example of FIG. 5, the carrier aggregation may involve certain functionalities by the $PCell_{MCG}$ of the MeNodeB 505-a. For example, the $PCell_{MCG}$ may handle certain functionalities such as physical uplink control channel (PUCCH), contention-based random access control channel (RACH), and semi-persistent scheduling to name a few. Carrier aggregation with dual or multiple connectivity wireless communications to non-collocated eNodeBs may involve having to make some enhancements and/or modifications to the manner in which carrier aggregation is otherwise performed. Some of the enhancements and/or modifications may involve having the UE 515 connected to the MeNodeB 505-a and to the SeNodeB 505-b as described above. Other features may include, for example, having a timer adjustment group (TAG) comprise cells of one of the eNodeBs, having contention-based and contention-free random access (RA) allowed on the SeNodeB 505-b, separate discontinuous reception (DRX) procedures for the MeNodeB 505-a and to the SeNodeB 505-b, having the UE 515 send a buffer status report (BSR) to the eNodeB where the one or more bearers (e.g., eNodeB specific or split bearers) are served, as well as enabling one or more of power headroom report (PHR), power control, semi-persistent scheduling (SPS), and logical channel prioritization in connection with the $PCell_{SCG}$ in the secondary eNodeB 505-b. The enhancements and/or modifications described above, and well as others provided in the disclosure, are intended for purposes of illustration and not of limitation.

For carrier aggregation in dual connectivity, different functionalities may be divided between the MeNodeB 505-a and the SeNodeB 505-b. For example, different functionalities may be statically divided between the MeNodeB 505-a and the SeNodeB 505-b or dynamically divided between the MeNodeB 505-a and the SeNodeB 505-b based on one or more network parameters. In an example, the MeNodeB 505-a may perform upper layer (e.g., above the media access control (MAC) layer) functionality via a $PCell_{MCG}$, such as but not limited to functionality with respect to initial configuration, security, system information, and/or radio link failure (RLF). As described in the example of FIG. 5, the $PCell_{MCG}$ may be configured as one of the cells of the MeNodeB 505-a that belong to the MCG. The $PCell_{MCG}$ may be configured to provide lower layer functionalities (e.g., MAC/PHY layer) within the MCG.

In an example, the SeNodeB 505-b may provide configuration information of lower layer functionalities (e.g., MAC/PHY layers) for the SCG. The configuration information may be provided by the $PCell_{SCG}$ as one or more radio resource control (RRC) messages, for example. The $PCell_{SCG}$ may be configured to have the lowest cell index (e.g., identifier or ID) among the cells in the SCG. For example, some of the functionalities performed by the SeNodeB 505-b via the $PCell_{SCG}$ may include carrying the PUCCH, configuring the cells in the SCG to follow the DRX configuration of the $PCell_{SCG}$, configure resources for contention-based and contention-free random access on the SeNodeB 505-b, carrying downlink (DL) grants having transmit power control (TPC) commands for PUCCH, estimating pathloss based on $PCell_{SCG}$ for other cells in the SCG, providing common search space for the SCG, and providing SPS configuration information for the UE 515.

In some aspects, the $PCell_{MCG}$ may be configured to provide upper level functionalities to the UE 515 such as security, connection to a network, initial connection, and/or radio link failure, for example. The $PCell_{MCG}$ may be configured to carry physical uplink control channel (PUCCH) for cells in the MCG, to include the lowest cell index among the MCG, to enable the MCG cells to have the same discontinuous reception (DRX) configuration, to configure random access resources for one or both of contention-based and contention-free random access on the MeNodeB 505-a, to enable downlink grants to convey transmit power control (TPC) commands for PUCCH, to enable pathloss estimation for cells in the MCG, to configure common search space for the MeNodeB 505-a, and/or to configure semi-persistent scheduling.

In some aspects, the PCell$_{SCG}$ may be configured to carry PUCCH for cells in the SCG, to include the lowest cell index among the SCG, to enable the SCG cells to have the same DRX configuration, to configure random access resources for one or both of contention-based and contention-free random access on the SeNodeB 505-b, to enable downlink grants to convey TPC commands for PUCCH, to enable pathloss estimation for cells in the SCG, to configure common search space for the SeNodeB 505-b, and/or to configure semi-persistent scheduling.

Returning to the example of FIG. 5, the UE 515 may support parallel PUCCH and physical uplink shared channel (PUSCH) configurations for the MeNodeB 505-a and the SeNodeB 505-b. In some cases, the UE 515 may use a configuration (e.g., UE 515 based) that may be applicable to both carrier groups. These PUCCH/PUSCH configurations may be provided through RRC messages, for example.

The UE 515 may also support parallel configuration for simultaneous transmission of acknowledgement (ACK)/negative acknowledgement (NACK) and channel quality indicator (CQI) and for ACK/NACK/sounding reference signal (SRS) for the MeNodeB 505-a and the SeNodeB 505-b. In some cases, the UE 515 may use a configuration (e.g., UE based and/or MCG or SCG based) that may be applicable to both carrier groups. These configurations may be provided through RRC messages, for example.

Figure 6:
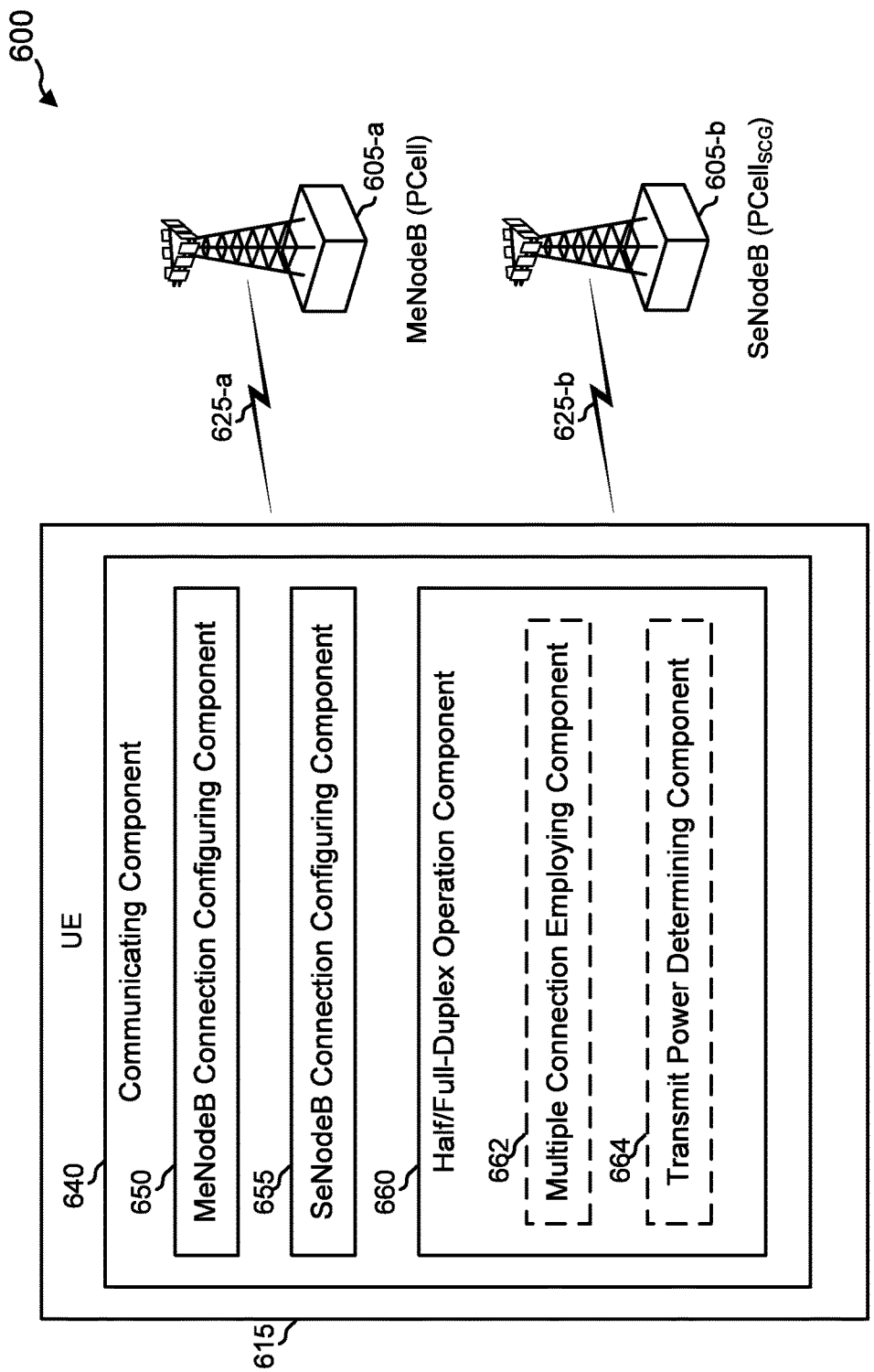
FIG. 6 is a block diagram conceptually illustrating an example of a UE and components configured in accordance with an aspect of the present disclosure.
Figure 7:
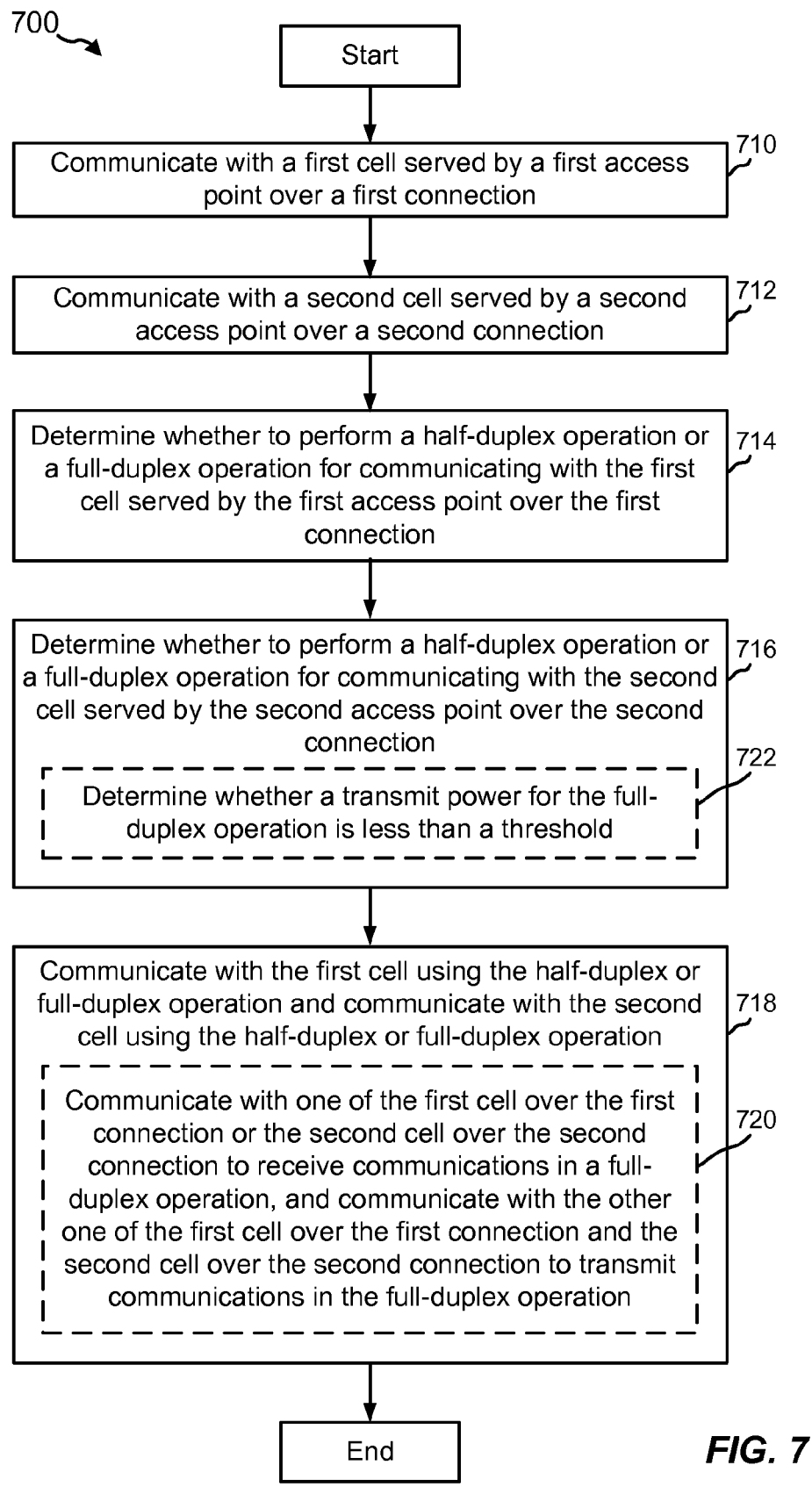
FIG. 7 is a flowchart illustrating a method for configuring half-duplex or full-duplex in multiple connectivity in accordance with an aspect of the present disclosure.

FIG. 6 is a block diagram 600 conceptually illustrating an example of a UE 615 and components configured in accordance with an aspect of the present disclosure. FIG. 7, which is described in conjunction with FIG. 6 herein, illustrates an example method 700 in accordance with aspects of the present disclosure. Although the operations described below in FIG. 7 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Referring to FIG. 6, a base station/eNodeB 605-a (MeNodeB with a PCell$_{MCG}$), a base station/eNodeB 605-b (SeNodeB with a PCell$_{SCG}$), and the UE 615 of diagram 600 may be one of the base stations/eNodeBs (or APs) and UEs as described in various Figures. The MeNodeB 605-a, or a PCell$_{MCG}$ related thereto, and the UE 615 may communicate over communication link 625-a. The SeNodeB 605-b, or a PCell$_{SCG}$ related thereto, and the UE 615 may communicate over communication link 625-b. Each of the communication links 625-a, 625-b may be an example of the communication links 125 of FIG. 1 and/or may include one or more component carriers (e.g., LTE component carriers 330-1 to 330-N, 330-M to 330-P, etc. in FIG. 3). In addition, for example, UE 615 can receive a CA band configuration for communication link 625-a (e.g., from the MeNodeB 605-a) and another CA band configuration for communication link 625-b (e.g., from the SeNodeB 605-b).

In this regard, UE 615 may include a communicating component 640 to manage communications over the communication links 625-a, 625-b between UE 615 and MeNodeB 605-a and SeNodeB 605-b, respectively, according to the received CA band configurations. For example, the CA band configurations can specify bands for each of one or more carriers configured for each communication link 625-a, 625-b, resources over each of the bands over which UE 615 can communicate (e.g., using one or more channels or otherwise), a subframe configuration (e.g., for time division duplexing (TDD) communications), subframe direction, handling of channel state information (CSI), handling of PHICH availability, etc. for the related eNodeBs and/or MCG, SCG, etc. In one example, communicating component 640 can indicate one or more capabilities of UE 615 to the MeNodeB 605-a and/or SeNodeB 605-b, from which the CA band configuration can be generated. For example, the one or more capabilities of the UE 615 can relate to whether the UE 615 can communicate using half and/or full duplexing, transmit power capabilities, etc.

Referring to FIG. 7, method 700 includes, at Block 710, communicating with a first cell served by a first access point over a first connection. For example, UE 615 (FIG. 6) can include communicating component 640 for communicating with the first cell (e.g., an MCG) served by the first access point (e.g., the MeNodeB 605-a (and/or other eNodeBs)) over the first connection (e.g., communication link 625-a and/or one or more component carriers associated therewith). In an example, communicating component 640 may include a MeNodeB connection configuring component 650 may receive first configuration information for the communication link 625-a, such as full/half-duplex configuration information indicating whether to perform full- or half-duplex operations, a CA band configuration indicating over which component carriers UE 615 can communicate with MeNodeB 605-a, which subframes during which the UE 615 can expect to receive or transmit communications from/to the MeNodeB 605-a, etc., and/or additional configuration information described above. Communicating component 640 can communicate with MeNodeB 605-a, or a related PCell$_{MCG}$, over communication link 625-a according to the first configuration information. This can include communicating component 640 communicating with the MeNodeB 605-a based on the CA band configuration, based on one or more capabilities of the UE 615 (e.g., given the CA band configuration or otherwise), and/or the like.

Method 700 also includes, at Block 712, communicating with a second cell served by a second access point over a second connection. This can allow for multiple connectivity wireless communications by communicating with the first and second cells. For example, communicating component 640 can communicate with the second cell (e.g., an SCG) served by the second access point (e.g., the SeNodeB 605-b and/or other eNodeBs) over the second connection (e.g., communication link 625-b and/or one or more component carriers associated therewith). In an example, communicating component 640 may include a SeNodeB connection configuring component 655 may receive second configuration information for the communication link 625-b, such as half/full-duplex configuration information indicating whether to perform full- or half-duplex operations, a CA band configuration indicating over which component carriers UE 615 can communicate with SeNodeB 605-b, which subframes during which the UE 615 can expect to receive or transmit communications from/to the SeNodeB 605-b, etc., and/or additional configuration information, as described above. Communicating component 640 can communicate with SeNodeB 605-b, or a related PCell$_{SCG}$, over communication link 625-b according to the second configuration information. This can include communicating component 640 communicating with the MeNodeB 605-a based on the CA band configuration, based on one or more capabilities of the UE 615, etc., as described above.

Method 700 additionally includes, at Block 714, determining whether to perform a half-duplex operation or a full-duplex operation for communicating with the first cell served by the first access point over the first connection. UE 615 can additionally include a half/full-duplex operation component 660 can determine whether to perform the half-duplex operation or the full-duplex operation for communicating with the first cell (e.g., the MCG) served by the first access point (e.g., the MeNodeB 605-a) over the first connection (e.g., communication link 625-a and/or one or more component carriers associated therewith), which may be based at least in part on the received half/full-duplex configuration information, CA band configuration received from MeNodeB 605-a and/or SeNodeB 605-b, one or more UE 615 capabilities, and/or the like. For example, half/full-duplex operation component 660 can determine whether to perform half-duplex or full-duplex operations over the communication link 625-a and/or 625-b based on the first configuration information and second configuration information, respectively.

Method 700 additionally includes, at Block 716, determining whether to perform a half-duplex operation or a full-duplex operation for communicating with the second cell served by the second access point over the second connection. Thus, half/full-duplex operation component 660 can also determine whether to perform the half-duplex operation or the full-duplex operation for communicating with the second cell (e.g., the SCG) served by the second access point (e.g., the SeNodeB 605-b) over the second connection (e.g., communication link 625-b or one or more component carriers associated therewith), which may be based at least in part on the CA band configuration received from MeNodeB 605-a and/or SeNodeB 605-b, one or more UE 615 capabilities, and/or the like. In this regard, communicating component 640 can communicate over communication link 625-a and/or communication link 625-b in dual-connectivity by performing half-duplex or full-duplex operations, depending on the respective half/full-duplex configuration information, CA band configurations, UE 615 capabilities, and/or the like.

Moreover, method 700 may optionally include, at Block 718, communicating with the first cell using the half-duplex or full-duplex operation and communicating with the second cell using the half-duplex or full-duplex operation. Communicating component 640 can communicate with the first cell (e.g., the MCG) using the half-duplex or full duplex operation, which may be based on half/full-duplex operation component 660 determining whether to perform the half-duplex or full-duplex operation with the first cell. Additionally, for example, communicating component 640 can communicate with the second cell (e.g., the SCG) using the half-duplex or full duplex operation, which may be based on half/full-duplex operation component 660 determining whether to perform the half-duplex or full-duplex operation with the second cell. For example, communicating using a half-duplex operation may include transmitting communications to the MeNodeB 605-a or SeNodeB 605-b or receiving communications from the MeNodeB 605-a or SeNodeB 605-b based on a subframe configuration (e.g., in TDD) or based on other information corresponding to a CA band configuration, UE 615 capability, etc.

In an example, communicating with the first cell and the second cell at Block 718 may optionally include, at Block 720, communicating with one of the first cell over the first connection or the second cell over the second connection to receive communications in a full-duplex operation, and communicating with the other one of the first cell over the first connection and the second cell over the second connection to transmit communications in the full-duplex operation. Half/full-duplex operation component 660 may optionally include a multiple connection employing component 662 that can communicate with the first cell (e.g., the MCG) over the first connection (e.g., communication link 625-a) or the second cell (e.g., SCG) over the second connection (e.g., communication link 625-b) to receive communications in the full-duplex operation, and communicating with the other one of the first cell over the first connection or the second cell over the second connection to transmit communications in the full-duplex operation. Thus, for example, where a configuration (e.g., a CA band configuration for communication link 625-a, 625-b, UE 615 capabilities, etc.) allows half-duplex operations with MeNodeB 605-a or SeNodeB 605-b, an optional multiple connection employing component 662 can utilize both communication links 625-a and 625-b to perform the full-duplex operation in multiple connectivity wireless communications. In particular, for example, multiple connection employing component 662 can instruct the communicating component 640 to transmit communications over one of the communication links 625-a or 625-b while receiving communications over the other one of communication links 625-a or 625-b (e.g., in a given time interval or otherwise). It is to be appreciated that full-duplex operations may be requested from an upper layer of the UE 615 (e.g., an application executing on the UE 615, desired to provide a quality of service specified by a bearer of UE 615, and/or the like), and multiple connection employing component 662 can accordingly utilize the multiple communication links 625-a, 625-b to provide full-duplex operations to satisfy the request. In another example, half/full-duplex operation component 660 can utilize the multiple communication links 625-a, 625-b to perform full-duplex operations based on determining that multiple connection employing component 662 is able to use the multiple connections (e.g., based on the CA band configuration, a resource configuration related to the bands, and/or the like).

In another example, determining whether to perform a half-duplex or full-duplex operation with one of the cells may be based on a transmit power for communicating with the cells. For example, if the transmit power of the UE 615 is low enough, a dedicated radio frequency (RF) filter may not be needed to enable full duplex operation, and thus full-duplex operation may be enabled in any case when the transmit power is less than the threshold. Thus, in an example, determining whether to perform half-duplex or full-duplex operation with the second cell at Block 716 may optionally include, at Block 722, determining whether a transmit power for the full-duplex operation is less than a threshold. For instance, half/full-duplex operation component 660 may optionally include a transmit power determining component 664 that can determine a transmit power for communicating with the SeNodeB 605-b over communication link 625-b, and half/full-duplex operation component 660 can determine whether the transmit power for the full-duplex operation is less than a threshold. In this case, half/full-duplex operation component 660 can determine to perform full-duplex operations over communication link 625-b when the power is less than the threshold. In an example, transmit power determining component 664 can determine the transmit power based on a power class of the SeNodeB 605-b (e.g., based on determining that SeNodeB 605-b is a small cell), based on a transmit power configured for the UE 615 by the SeNodeB 605-b, based on radio conditions or a detected proximity to SeNodeB 605-*b*, and/or the like. For example, where SeNodeB 605-*b* is a small cell, UE 615 can suppress a transmit signal to be below the threshold such that a dedicated RF filter is not required to enable full-duplex operation over communication link 625-*b* as long as the transmit power is low. In an example, the threshold may be 10 decibels. Thus, the small cell can receive the transmission at the low power. In this regard, where half-duplex is configured with the MeNodeB 605-*a* over communication link 625-*a*, half/full-duplex operation component 660 can configure full-duplex operations with SeNodeB 605-*b* over communication link 625-*b* based on determining the transmit power for the UE 615 as less than the threshold power. It is to be appreciated that the threshold and/or the full-duplex configuration based on the threshold may be configured by the MeNodeB 605-*a* and/or SeNodeB 605-*b*, such that the communicating component 640 can receive a configuration and determine to perform the full-duplex operation based additionally on the configuration.

It is to be appreciated that in non-dual connectivity scenarios, SeNodeB 605-*b* can be the same as or part of MeNodeB 605-*a* such to provide a second cell (e.g., an SCell) with which UE 615 communicates over the communication link 625-*b*. For example, where the second cell is supported for CA by also allowing PUCCH communications (e.g., based on a CA band configuration received for communicating with in a first cell and the second cell over the CA bands), full-duplex or half-duplex operations can be determined on one or more carriers or groups of carriers configured for each one of the first and second cells individually, as described above with respect to cells provided by MeNodeB 605-*a* and SeNodeB 605-*b*. Performing the full-duplex or half-duplex operations may be based on the CA band configuration received for the first and second cells, UE 615 capabilities, and/or the like. Moreover, in this example, multiple connection employing component 662 can leverage multiple groups of carriers to perform full-duplex operations where each (or at least one or more) of the groups support half-duplex operations, as described.

Figure 8:
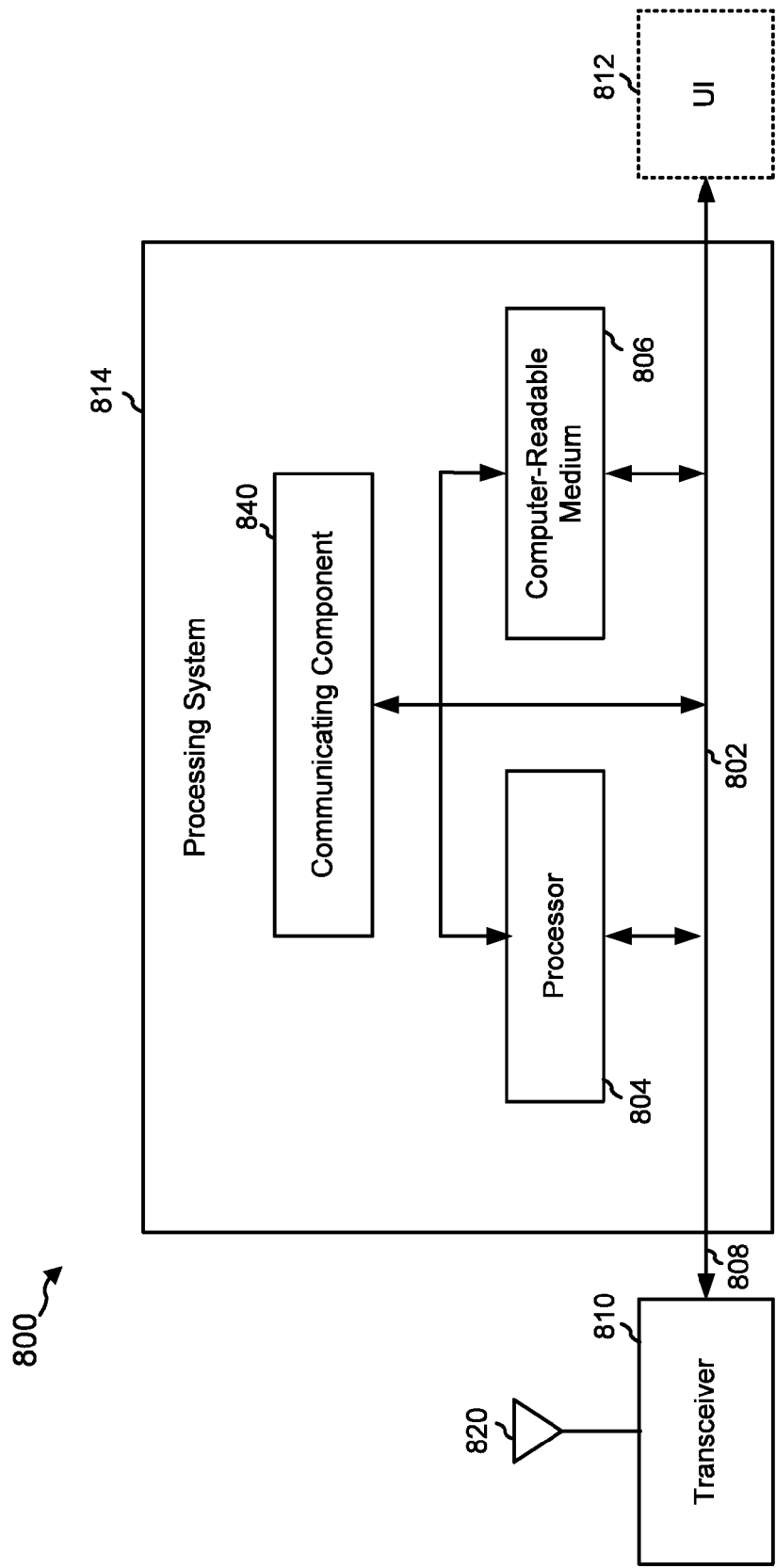
FIG. 8 is a block diagram conceptually illustrating an example hardware implementation for an apparatus employing a processing system configured in accordance with an aspect of the present disclosure.

FIG. 8 is a block diagram conceptually illustrating an example hardware implementation for an apparatus 800 employing a processing system 814 configured in accordance with an aspect of the present disclosure. The processing system 814 includes a communicating component 840. In one example, the apparatus 800 may be the same or similar, or may be included with one of the UEs described in various Figures. In such example, the communicating component 840 may correspond to, for example, the communicating component 640. In this example, the processing system 814 may be implemented with a bus architecture, represented by the bus 802. The bus 802 may include any number of interconnecting buses and bridges depending on the application of the processing system 814 and the overall design constraints. The bus 802 links together various circuits including one or more processors (e.g., central processing units (CPUs), microcontrollers, application specific integrated circuits (ASICs), field programmable gate arrays (FPGAs)) represented by the processor 804, and computer-readable media, represented by the computer-readable medium 806. The bus 802 may also link various other circuits such as timing sources, peripherals, voltage regulators, and power management circuits, which are well known in the art, and therefore, will not be described any further. A bus interface 808 provides an interface between the bus 802 and a transceiver 810, which is connected to one or more antennas 820 for receiving or transmitting signals. The transceiver 810 and the one or more antennas 820 provide a mechanism for communicating with various other apparatus over a transmission medium (e.g., over-the-air). Depending upon the nature of the apparatus, a user interface (UI) 812 (e.g., keypad, display, speaker, microphone, joystick) may also be provided.

The processor 804 is responsible for managing the bus 802 and general processing, including the execution of software stored on the computer-readable medium 806. The software, when executed by the processor 804, causes the processing system 814 to perform the various functions described herein for any particular apparatus. The computer-readable medium 806 may also be used for storing data that is manipulated by the processor 804 when executing software. The communicating component 840 as described above may be implemented in whole or in part by processor 804, or by computer-readable medium 806, or by any combination of processor 804 and computer-readable medium 806.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but it is to be accorded the widest scope consistent with the principles and novel features disclosed herein.

What is claimed is:

1. A method for communicating, by a user equipment, using multiple connectivity wireless communications in a wireless network, comprising:
   receiving, from a first access point, a first carrier aggregation band configuration of a first cell specifying frequency resources over which the user equipment is to communicate over each of a first plurality of carriers including at least one carrier with the first access point;
   receiving, from a second access point, a second carrier aggregation band configuration of a second cell specifying second frequency resources over which the user equipment is to communicate over each of a second plurality of carriers including at least one second carrier with the second access point;
   determining, based at least in part on the first carrier aggregation band configuration of the first cell, whether to perform a first half-duplex operation or a first full-duplex operation for communicating, over the at least one carrier, with the first cell served by the first access point over a first connection;
   determining, based at least in part on the second carrier aggregation band configuration of the second cell, to perform a second half-duplex operation for communicating, over the at least one second carrier, with the second cell served by the second access point over a second connection;
   communicating with the first cell to transmit or receive, as part of the first half-duplex operation or the first full-duplex operation, first data over the first connection; and
   communicating with the second cell to transmit or receive, as part of the second half-duplex operation, second data over the second connection,
   wherein the communicating with the first cell and the communicating with the second cell are part of a full-duplex operation.

2. The method of claim 1, wherein the first connection and the second connection only support half-duplex operations in a time interval related to performing the full-duplex operation.

3. The method of claim 1, wherein at least one of determining whether to perform the first half-duplex operation or the first full-duplex operation for communicating with the first cell or determining to perform the second half-duplex operation for communicating with the second cell is based at least in part on a configuration.

4. The method of claim 3, wherein the configuration relates to a carrier aggregation band configuration of a respective one of the first connection and the second connection.

5. The method of claim 3, wherein the configuration relates to one or more capabilities of a user equipment (UE) for communicating using a respective one of the first connection and the second connection.

6. The method of claim 1, wherein determining whether to perform the first half-duplex operation or the first full-duplex operation for communicating with the first cell comprises determining to perform the first full-duplex operation based at least in part on determining a transmit power for the first full-duplex operation is less than a threshold power.

7. The method of claim 1, wherein the first access point and the second access point are the same access point supporting carrier aggregation over the first cell and the second cell.

8. An apparatus for communicating using multiple connectivity wireless communications in a wireless network, comprising:
   a memory; and
   at least one processor coupled to the memory, wherein the at least one processor is configured to:
   receive, from a first access point, a first carrier aggregation band configuration of a first cell specifying frequency resources over which the apparatus is to communicate over each of a first plurality of carriers including at least one carrier with the first access point;
   receive, from a second access point, a second carrier aggregation band configuration of a second cell specifying second frequency resources over which the apparatus is to communicate over each of a second plurality of carriers including at least one second carrier with the second access point;
   determine, based at least in part on the first carrier aggregation band configuration of the first cell, whether to perform a first half-duplex operation or a first full-duplex operation for communicating, over the at least one carrier, with the first cell served by the first access point over a first connection;

determine, based at least in part on the second carrier aggregation band configuration of the second cell, to perform a second half-duplex operation for communicating, over the at least one second carrier, with the second cell served by the second access point over a second connection;

communicate with the first cell to transmit or receive, as part of the first half-duplex operation or the first full-duplex operation, first data over the first connection; and communicate with the second cell to transmit or receive, as part of the second half-duplex operation, second data over the second connection, wherein the at least one processor communicates, as part of a full-duplex operation, the first data with the first cell and the second data with the second cell.

9. The apparatus of claim 8, wherein the first connection and the second connection only support half-duplex operations in a time interval related to performing the full-duplex operation with the first cell and the full-duplex operation with the second cell.

10. The apparatus of claim 8, wherein the at least one processor is configured to at least one of determine whether to perform the first half-duplex operation or the first full-duplex operation for communicating with the first cell or determine to perform the second half-duplex operation for communicating with the second cell based at least in part on a configuration.

11. The apparatus of claim 10, wherein the configuration relates to a carrier aggregation band configuration of a respective one of the first connection and the second connection.

12. The apparatus of claim 10, wherein the configuration relates to one or more capabilities of a user equipment (UE) for communicating using a respective one of the first connection and the second connection.

13. The apparatus of claim 8, wherein the at least one processor is configured to determine whether to perform the first half-duplex operation or the first full-duplex operation for communicating with the first cell at least in part by determining to perform the first full-duplex operation based at least in part on determining a transmit power for the first full-duplex operation is less than a threshold power.

14. The apparatus of claim 8, wherein the first access point and the second access point are the same access point supporting carrier aggregation over the first cell and the second cell.

15. An apparatus for communicating using multiple connectivity wireless communications in a wireless network, comprising:

means for receiving, from a first access point, a first carrier aggregation band configuration of a first cell specifying frequency resources over which the apparatus is to communicate over each of a first plurality of carriers including at least one carrier with the first access point;

means for receiving, from a second access point, a second carrier aggregation band configuration of a second cell specifying second frequency resources over which the apparatus is to communicate over each of a second plurality of carriers including at least one second carrier with the second access point;

means for determining, based at least in part on the first carrier aggregation band configuration of the first cell, whether to perform a first half-duplex operation or a first full-duplex operation for communicating, over the at least one carrier, with the first cell served by the first access point over a first connection; and means for determining, based at least in part on the second carrier aggregation band configuration of the second cell, to perform a second half-duplex operation for communicating, over the at least one second carrier, with the second cell served by the second access point over a second connections;

means for communicating with the first cell to transmit or receive, as part of the first half-duplex operation or the first full-duplex operation, first data over the first connection and communicating with the second cell to transmit or receive, as part of the second half-duplex operation, second data over the second connection, wherein the means for communicating communicates, as part of a full-duplex operation, the first data over the first connection and the second data over the second connection.

16. The apparatus of claim 15, wherein the first connection and the second connection only support half-duplex operations in a time interval related to performing the full-duplex operation with the first cell and the full-duplex operation with the second cell.

17. The apparatus of claim 15, wherein the means for determining whether to perform the first half-duplex operation or the first full-duplex operation for communicating with the first cell or the means for determining to perform the second half-duplex operation for communicating with the second cell determine based at least in part on a configuration.

18. The apparatus of claim 17, wherein the configuration relates to a carrier aggregation band configuration of a respective one of the first connection and the second connection.

19. The apparatus of claim 17, wherein the configuration relates to one or more capabilities of a user equipment (UE) for communicating using a respective one of the first connection and the second connection.

20. The apparatus of claim 15, wherein the first access point and the second access point are the same access point supporting carrier aggregation over the first cell and the second cell.

21. The apparatus of claim 15, wherein the means for determining whether to perform the first half-duplex operation or the first full-duplex operation for communicating with the first cell determines at least in part by determining to perform the first full-duplex operation based at least in part on determining a transmit power for the first full-duplex operation is less than a threshold power.

22. A non-transitory computer-readable storage medium storing computer executable code for communicating, by a user equipment, using multiple connectivity wireless communications in a wireless network, comprising:

code for receiving, from a first access point, a first carrier aggregation band configuration of a first cell specifying frequency resources over which the user equipment is to communicate over each of a first plurality of carriers including at least one carrier with the first access point;

code for receiving, from a second access point, a second carrier aggregation band configuration of a second cell specifying second frequency resources over which the user equipment is to communicate over each of a second plurality of carriers including at least one second carrier with the second access point;

code for determining, based at least in part on the first carrier aggregation band configuration of the first cell, whether to perform a first half-duplex operation or a first full-duplex operation for communicating, over the at least one carrier, with the first cell served by the first access point over a first connection; and code for determining, based at least in part on the second carrier aggregation band configuration of the second cell, to perform a second half-duplex operation for communicating, over the at least one second carrier, with the second cell served by the second access point over a second connection;

code for communicating with the first cell to transmit or receive, as part of the first half-duplex operation or the first full-duplex operation, communications over the first connection and communicating, as part of the full-duplex operation, with the second cell to transmit or receive, as part of the second half-duplex operation, communications over the second connection, wherein the code for communicating communicates, as part of a full-duplex operation, the first data over the first connection and the second data over the second connection.

23. The non-transitory computer-readable storage medium of claim 22, wherein the first connection and the second connection only support half-duplex operations in a time interval related to performing the full-duplex operation with the first cell and the full-duplex operation with the second cell.

24. The non-transitory computer-readable storage medium of claim 22, wherein the code for determining whether to perform the first half-duplex operation or the first full-duplex operation for communicating with the first cell or the code for determining to perform the second half-duplex operation for communicating with the second cell determine based at least in part on a configuration.

25. The non-transitory computer-readable storage medium of claim 24, wherein the configuration relates to a carrier aggregation band configuration of a respective one of the first connection and the second connection.

26. The non-transitory computer-readable storage medium of claim 24, wherein the configuration relates to one or more capabilities of a user equipment (UE) for communicating using a respective one of the first connection and the second connection.

27. The non-transitory computer-readable storage medium of claim 22, wherein the first access point and the second access point are the same access point supporting carrier aggregation over the first cell and the second cell.

28. The non-transitory computer-readable storage medium of claim 22, wherein the code for determining whether to perform the first half-duplex operation or the first full-duplex operation for communicating with the first cell comprises code for determining to perform the first full-duplex operation based at least in part on determining a transmit power for the first full-duplex operation is less than a threshold power.

* * * * *